US008401546B2

(12) United States Patent
Landry et al.

(10) Patent No.: US 8,401,546 B2
(45) Date of Patent: Mar. 19, 2013

(54) UNIVERSAL ACQUISITION AND TRACKING APPARATUS FOR GLOBAL NAVIGATION SATELLITE SYSTEM (GNSS)

(75) Inventors: Rene Jr Landry, Montreal (CA); Marc-Antoine Fortin, Repentigny (CA); Jean-Christophe Guay, Montreal (CA)

(73) Assignee: Ecole de Technologie Superieure, Montreal (CA)

( * ) Notice: Subject to any disclaimer, the term of this patent is extended or adjusted under 35 U.S.C. 154(b) by 540 days.

(21) Appl. No.: 12/767,773

(22) Filed: Apr. 26, 2010

(65) Prior Publication Data

US 2011/0261805 A1    Oct. 27, 2011

(51) Int. Cl.
*H04W 4/00* (2009.01)
*G01S 19/00* (2010.01)
*G01C 21/04* (2006.01)
*G01C 21/00* (2006.01)
*H04B 7/185* (2006.01)

(52) U.S. Cl. ............... 455/427; 370/316; 342/357.2; 701/412; 701/468

(58) Field of Classification Search .......... 370/316; 455/3.02, 427–430, 12.1–13.2; 342/21, 252–357.34, 342/357.36, 357.39–357.72, 358; 340/985; 701/200, 206, 400–479; 707/917–920
See application file for complete search history.

(56) References Cited

U.S. PATENT DOCUMENTS 5,774,829 A * 6/1998 Cisneros et al. ............ 701/475
5,943,606 A * 8/1999 Kremm et al. .............. 455/12.1
6,229,479 B1   5/2001 Kozlov et al.
6,667,713 B2 * 12/2003 Green et al. ............. 342/357.31
7,142,521 B2 * 11/2006 Haugli et al. ................ 370/320

(Continued)

FOREIGN PATENT DOCUMENTS

EP    1279970 A2    1/2003
EP    1674881 A2    6/2006

(Continued)

OTHER PUBLICATIONS

G. Heinrichs et al., A Combined GNSS/UMTS Receiver Architecture for User Equipment Positioning, 16th Annual IEEE International Symposium on Personal, Indoor and Mobile Radio Communications, http://www.gawain-receivers.com/publications/GAWAIN_PIMRC_2005.pdf, Sep. 11-14, 2005, p. 5, Berlin/GER.

(Continued)

*Primary Examiner* — Thai Hoang
(74) *Attorney, Agent, or Firm* — IP-MEX Inc.; Victoria Donnelly

(57) ABSTRACT

An acquisition and tracking apparatus is provided for tracking digitized spread spectrum navigation signals modulated with a spreading code according to any of a set of modulation types including Binary Phase Shift Keying (BPSK) with and without Frequency Domain Multiplexing Access (FDMA), time multiplexed BPSK, Quadrature Phase Shift Keying (QPSK), sine and cosine Binary Offset Carrier (BOC), modified, complex, and time multiplexed BOC (TMBOC), the apparatus comprising a plurality of universal tracking channels, each coupled to an interrupt module. The universal tracking channel includes a carrier demodulation module, a code generation module, a correlator module, a code frequencies generation module, and a subcarrier combining module for efficiently using the correlator resources in the correlation of the data and the pilot components of the signal within a single universal tracking channel. A corresponding method of operation is also provided.

24 Claims, 13 Drawing Sheets

U.S. PATENT DOCUMENTS

| | | | |
|---|---|---|---|
| 7,305,021 | B2 | 12/2007 | Ledvina |
| 7,428,259 | B2 | 9/2008 | Wang et al. |
| 7,538,721 | B2 | 5/2009 | Vollath |
| 8,195,108 | B2* | 6/2012 | Sheynblat et al. ......... 455/127.1 |
| 2002/0015423 | A1* | 2/2002 | Rakib et al. .................... 370/485 |
| 2002/0036996 | A1* | 3/2002 | Ozluturk et al. ............. 370/335 |
| 2003/0154025 | A1* | 8/2003 | Fuchs et al. ................... 701/213 |
| 2005/0114023 | A1* | 5/2005 | Williamson et al. .......... 701/214 |
| 2007/0021122 | A1* | 1/2007 | Lane et al. .................... 455/441 |
| 2009/0189808 | A1 | 7/2009 | Chen |
| 2010/0240396 | A1* | 9/2010 | Zhang et al. ............... 455/456.1 |

FOREIGN PATENT DOCUMENTS

| | | |
|---|---|---|
| EP | 1 729 145 A1 | 12/2006 |
| EP | 2037291 A1 | 3/2009 |
| WO | WO0197407 A1 | 12/2001 |
| WO | WO2006074822 A1 | 7/2006 |
| WO | WO 2008/048242 A2 | 4/2008 |

OTHER PUBLICATIONS

Spirent, Inside GNSS, Averna Launches New Version of Universal Receiver Tester for GPS, http://www.insidegnss.com/node/1693, Sep. 30, 2009, p. 2, Gibbons Media & Research LLC, Eugene, Oregon, USA.

Maxim, Industry's First Universal, Single-Chip GNSS Receiver Achieves Total Cascaded NF of 1.4dB and Eliminates External LNA, http://www.maxim-ic.com/view_press_release.cfm/release_id/1340, 2010, Maxim Integrated Products.

ECN, Universal, Single-Chip GNSS Receiver Eliminates External LNA, http://www.ecnmag.com/Products/2007/06/Universal, Mar. 4, 2010, p. 2, Advantage Business Media.

Microwaves and RF, Trusted Resource for the Working RF Engineer, http://www.microwavesrf.com/Article/ArticleID/16012/16012.html, Mar. 4, 2010, p. 2, Penton Media, Inc.

Thomas Net News, Industry's First Universal, Single-Chip GNSS Receiver Achieves Total Cascaded NF of 1.4dB and Eliminates External LNA, Maxim Integrated Products, http://news.thomasnet.com/companystory/530661, Mar. 4, 2010, p. 6, Thomas Publishing Company.

Maxim, MAX2769, Universal GPS Receiver, Improve GPS and Galileo Performance and Reduce Cost with the First Fully Programmable, Universal GNSS RF Receiver, http://www.maxim-ic.com/quick_view2.cfm/qv_pk/5241, page last modified Aug. 14, 2009, Mar. 4, 2010, p. 2, Maxim Integrated Products.

Topcon, G3 Enabled GNSS Receiver GR-3, www.topcompositioning.com, 2006, p. 6, Topcon Corporation, Livermore, CA.

The Free Librry by Farlex, Topcon Expands GPS+, Unveils All-Inclusive GNSS Receiver; New GR-3 receives all exieting, planned satellite signals; effere rugged design with 'bulletproof' warrenty, http://ww.thefreelibrary.com/Topcon+Expands+GPS%2B, +Unveils+All-Inclusive+GNSS+Receiver%3B . . . , Apr. 7, 2006, P. 3, Business Wire.

Topcon GR 3 GNSS—Receiver GPS+GLONASS+GAILLEO Receiver, www.topcon.eu, May 7, 2006, P. 4, Topcon Corporation, IJssel, The Netherlands.

P.Lay, Challenger at Agritechnica, Nov. 10-14, 2009, Auto-Guide sets course for higher productivity, www.agronaplo.hu/ . . . /Agritechnika_2009/Challenger_Agritechnika_EN.pdf.

Topcon, GNSS, G3 Enabled GNSS Receiver GR-3, Mar. 2010, P. 6, Topcon Corporation.

* cited by examiner

US 8,401,546 B2

UNIVERSAL ACQUISITION AND TRACKING APPARATUS FOR GLOBAL NAVIGATION SATELLITE SYSTEM (GNSS)

FIELD OF THE INVENTION

The present invention relates to the construction of a Global Navigation Satellite System (GNSS) receiver according to a number of configurations, some of these configurations including a number of signal standards.

BACKGROUND OF THE INVENTION

Over the years and especially since 2000 when the Selective Availability (SA) feature of the Global Positioning System (GPS) was deactivated, satellite based positioning has become a widely used technique in a variety of application fields. However, its use remains limited in terms of availability, integrity, accuracy and resistance to interference as described in Civil Aviation Authority, "GPS Integrity and Potential Impact on Aviation Safety" 2003 available at http://www.caa.co.uk/docs/33/CAPAP2003_09.pdf. These limitations indicate areas where current GPS receivers have exhibited a lack of robustness. Availability (and continuity) refers to in-view satellites continuously broadcasting signals. Integrity refers to the reliability of the system and of its compliance with specifications, or that signals are as they should be and any anomaly should be identified in time. Accuracy refers to the resolution of the navigation solution, i.e. the precision of the computed position. This depends on both the Dilution Of Precision (DOP), which models the satellites' geometry, and the User Equivalent Range Error (UERE). Interference resistance is an important characteristic since interference events, whether they are intentional (i.e. jamming) or not, could compromise the raw observation measurements (i.e. code and carrier phase measurements). Unintentional sources of interference include harmonics of other frequency bands, non-linearities of amplifiers, and multipath, which causes superposed reflections added to a direct line of sight (or direct path) signal. Jamming can take the form of narrow- or wide-band, constant or pulsed, fixed or sweeping sinusoidal waves. More sophisticated jammers, such as "spoofers", could also mimic and alter the true GPS signal by broadcasting another at higher power.

With the advent of more recent Global Navigation Satellite Systems (GNSS), including modernized GPS, the Global Orbiting Navigation Satellite System (GLONASS), Galileo and COMPASS systems, new signals, and new types of signals, are now broadcast, or at least should start being transmitted. These signals help resolve the above limitations of GPS. Indeed, higher signal bandwidths will increase the resistance to interference effects by diluting the impact of a narrow band interference over a larger bandwidth as described in Inside GNSS, "Benefits of the New GPS Civil Signal—The L2C study" vol. 18, pp. 42-56, 2006, available at http://www.insidegnss.com/auto/0706%20Benefits.pdf. The new signals should also provide better positioning accuracy and resistance to multipath since the chip period is shorter as described in M. Meurer, S. Erker, S. Thölert, O. Montenbruck, A. Hauschild, and R. B. Langley, "GPS L5 First Light—A Preliminary Analysis of SVN49's Demonstration Signal," GPS World, pp. p. 49-58, 2009, available at http://www.gpsworld.com/gnss-system/gps-modernization/innovation-15-signal-first-light-8661, thus requiring smaller correlator spacing and a higher sampling rate. Longer codes will increase cross-correlation protection of the signals and their robustness in weak signal environments. The higher number of satellites will increase availability while integrity should be improved through more detailed navigation messages and the deployment of control stations.

The modernization of existing Global Navigation Satellite Systems and the arrival of new systems have diversified to a great extent the range of navigation signals available for civil use. The additional signals address the four traditional weaknesses of the GPS, namely availability, accuracy, integrity and resistance to interferences. This justifies the importance of implementing new robust acquisition and tracking architectures capable of harvesting much more of the potential of the new signals in a compact design.

Currently, the most economical way to produce a navigation receiver is through an Application Specific Integrated Circuit (ASIC), which provides low-cost devices at high volumes. Therefore, hardware resource use of a GNSS channel is still an important consideration, despite the recent trend for pure software receivers or Software Defined Radios (SDR). Indeed, in ASIC designs that are based on signal-specific channels, and in which channels cannot be reconfigured on-the-fly, chances are good that high percentages of the chip will not be used most of the time. Also, populating many dedicated channels drives IC cost up. This is an important consideration going forward, as increasingly blocks of functionality i.e. such as GPS, or GNSS receivers are being implemented as IP cores and are therefore expected to occupy increasingly less of the overall ASIC real estate available.

Indeed, in the case of a totally Software Defined Receiver for GNSS, implemented on a Personal Computer (PC), there may be no issue regarding which of the navigation signals should be tracked. But most commercially available resource-limited receivers are not as flexible and still rely on parallel architectures implemented on dedicated hardware to cope with the large loads of computation required by the multi-channel tracking process.

What is required is the development of a universal design for an acquisition and tracking channel that applies to all currently defined or planned GNSS signals. In other words, with the advent of present satellite navigation systems using standards that do not necessarily use dedicated hardware elements efficiently, and the anticipated introduction of new satellites, and satellite systems using ever increasingly prevalent standards that may not be so easily addressed by dedicated hardware, there is a great need for an efficient architecture capable of addressing these processing needs.

SUMMARY OF THE INVENTION

There is an object of the invention to provide an improved apparatus for acquisition and tracking of global navigation satellite system (GNSS) signals.

According to one aspect of the invention, there is provided an acquisition and tracking apparatus for tracking a plurality of spread spectrum navigation signals, each modulated according to one of a set of modulation types on a higher frequency carrier converted into an intermediate frequency signal, the carrier comprising one or more subcarriers and a navigation message modulated with a spreading code, the spreading code comprising a data component for carrying the navigation message, the spreading codes having a nominal epoch which is essentially a multiple of a predetermined time period, the apparatus comprising a plurality N of channel processors, each said channel processors including:

a carrier demodulation module including a local carrier oscillator generating a local carrier frequency for demodulating the carrier from the intermediate frequency signal into a baseband signal;

a code frequency generation module including a local code oscillator generating a code clock (CCK) at a code frequency, for clocking the code generation module;

a code generation module generating replica of the data component, and a periodic interrupt signal which is substantially synchronous with the code epochs of the selected navigation signal;

a subcarrier combining module, generating subcarrier replicas;

a correlator module correlating the baseband signal with the replica of the data component and the subcarrier replicas, and outputting correlation signals sampled with the periodic interrupt signal;

a parameter parsing module for providing operational parameters including a nominal carrier frequency control signal to the local carrier oscillator and a code frequency control signal to the local code oscillator;

a discriminator module for processing the sampled correlation signals and generating a set of data synchronization error signals; and and an Error Evaluation Module generating a feedback value for adjusting the local carrier frequency and a Code Frequency Feedback signal for adjusting the code frequency.

In the acquisition and tracking apparatus described above, the carrier further comprises a pilot component modulated with a pilot code, and the code generation module comprises means for generating replicas of the pilot component; and the correlator module comprises means for correlating the baseband signal with the replicas of the pilot component, and outputting correlation signals sampled with the periodic interrupt signal.

In the acquisition and tracking apparatus described above, the set of CDMA modulation types includes Binary Phase Shift Keying (BPSK), Binary Phase Shift Keying (BPSK) with Frequency Domain Multiplexing Access (FDMA), time multiplexed BPSK, Quadrature Phase Shift Keying (QPSK), sine and cosine Binary Offset Carrier (BOC), modified, complex, and time multiplexed BOC (TMBOC). The set of CDMA modulation types includes Alternate BOC (AltBOC) where two channel processors are used.

The Error Evaluation Module comprises:

a set of programmable loop filters including:

a first loop filter of configurable orders 0, 1, and 2, filtering the error signals, and generating a feedback value for adjusting the local carrier frequency to substantially a frequency of the higher frequency carrier;

and second and third loop filters, each of one of configurable orders 0, 1, and 2, filtering the error signals; and an Improved Dual Estimator Module coupled to the outputs of the second and third loop filters, and generating a Code Frequency Feedback signal for adjusting the code frequency to be substantially equal a predetermined multiple of the frequency of the code epoch.

In the acquisition and tracking apparatus described above:
the local carrier oscillator comprises means for generating a carrier phase signal;
the local code oscillator comprises means for generating a code phase signal;
each of the carrier phase and the code phase being sampled with the periodic interrupt signal,
the acquisition and tracking apparatus further comprises:
a master clock module generating a global time signal including a global interrupt pulse; and a global interrupt manager, distributing the global time signal to channel processors and collecting accumulated data, including at least one of the correlation signals and the sampled carrier and code phase signals, from each channel processors and forwarding the accumulated data to a computer host for further processing.

The code generation module comprises:
a code counter clocked by the code clock (CCK);
a data code memory for storing a data code sequence, which corresponds to a data code sequence of the selected navigation signal and, sequentially addressed by the code counter outputting a primary data memory code bit stream is a primary part of the replica of the data component;

a data code shift register having a tap spacing input which defines a delay spacing, to programmably delay the primary data memory code bit stream and generate prompt (P_data), early (E_data), and late (L_data) versions of it, the delay between the early and prompt versions being equal to the delay between the prompt and late versions, the delay being determined by a tap spacing command included in the operational parameters and coupled operatively to the tap spacing input;

a pilot code memory for storing a pilot code sequence which corresponds to a pilot code sequence of the selected navigation signal and, sequentially addressed by the code counter outputting a primary pilot memory code bit stream, which is a primary part of the replica of the pilot code component;

a pilot code shift register having a tap spacing input which defines a delay spacing, to programmably delay the primary pilot memory code bit stream and generate prompt (P_data), early (E_data), and late (L_data) versions of it, the delay between the early and prompt versions being equal to the delay between the prompt and late versions, the delay being determined by the tap spacing command.

In the acquisition and tracking apparatus described above, processing at least one of the navigation signals, including modulation with at least one of data and pilot secondary spreading codes, the code generation module further comprises:

a Secondary Chip Register for buffering secondary data and pilot code chips periodically received from the parameter parsing module;

an exclusive OR gate for modifying the primary data memory code bit stream with the buffered secondary data code chip which is a secondary part of the replica of the data code component; and an exclusive OR gate for modifying the primary pilot memory code bit stream with the buffered secondary pilot code chip which is a secondary part of the replica of the pilot code component.

In the acquisition and tracking module described above, wherein at least one of the navigation signals includes modulation in which data and pilot codes are time multiplexed, the code generation module further comprises a Time Multiplexed BPSK (TMBPSK) Module including:

a frequency divider circuit for dividing the frequency of the code clock (CCK) by a factor and generating a "Slower Clock" signal;

a first single-bit selector for substituting the code clock (CCK) with the "Slower Clock" signal for clocking the binary code counter;

a Code Generator for generating a Pseudo Random Noise (PRN) code signal 664;

a time multiplexer for multiplexing the PRN code signal with the primary pilot memory code bit stream to generate an Effective Spreading Code;

a second single-bit selector for substituting the primary pilot memory code bit stream with the Effective Spreading Code for modification with the secondary data code chip by the exclusive OR gate.

In the acquisition and tracking apparatus described above, the code generation module comprises a data code shift register for delaying the replica of the data component by a programmable amount; and the correlator module comprises means for correlating the baseband signal with the delayed replica, and forwarding the correlation result to a computing host for evaluation.

In one embodiment of the invention, the correlator module comprises a data correlator array for correlating the baseband signal with the replicas of the data component including subcarrier replicas, and a pilot correlator array for correlating the baseband signal with the replicas of the pilot component including pilot subcarrier replicas.

The code frequency generation module comprises:

a code frequency oscillator generating a code super clock;

a first programmable sin-cosine divider for dividing the code super clock by a factor to generate a first raw sub-carrier signal, selectively programmed to have one of: a cosine or a sine phase relationship to the code clock;

a Sub-carrier 2 Shift Register having a tap spacing input which defines a delay spacing, to programmably delay the first raw sub-carrier signal and generate prompt (SC2P), early (SC2E), and late (SC2L) versions of a first subcarrier replica signal, the delay between the early and prompt versions being equal to the delay between the prompt and late versions, the delay being determined with the tap spacing command included in the operational parameters and coupled operatively to the tap spacing input.

In the embodiments of the invention, the code frequency generation module further comprises:

a Sub-Carrier Clock Divider (SC-CK Div) for dividing the code super clock by a first programmable factor (Div-Count 2) to generate an intermediate square wave;

a second programmable sin-cosine divider for dividing the intermediate square wave by a factor and to generate a second raw sub-carrier signal, selectively programmed to have one of a cosine or a sine phase relationship to the code clock;

a Sub-carrier 1 Shift Register (SC 1 SR) having a tap spacing input which defines a delay spacing, to programmably delay the second raw sub-carrier signal and generate prompt (SC1P), early (SC1E), and late (SC1L) versions of a second sub-carrier replica signal, the delay between the early and prompt versions being equal to the delay between the prompt and late versions, the delay being determined with the tap spacing command coupled operatively to the tap spacing input.

The code frequency generation module further comprises a Code Clock Divider (SC-CK Div) for dividing the intermediate square wave by a second programmable factor (Div-Count 1) to generate the code clock (CCK).

In the acquisition and tracking apparatus described above, the frequency of the of the local code oscillator being set to equal the nominal code frequency of the selected one of the navigation signals, and first and second programmable factors (Div-Count 2 and Div-Count 1) being set to unity one when no subcarrier replica signals are required.

In one embodiment of the invention, the data code shift register comprises:

a variable spacing tap controlled by a VSC Delay control signal, the variable spacing tap outputting a variable spacing "M_tap" code signal; and a variable spacing correlator for correlating the variable spacing "M_tap" code signal with the baseband signal to generate a variable spacing correlation (VSC) value.

The apparatus with the variable spacing correlator described above, further comprising a selector for selecting an in-phase component "I" of the baseband signal, alternatively uncorrelated or correlated with subcarriers as determined by a programmable parameter (VSC_select).

In an embodiment of the invention, the subcarrier combining module comprises:

a first subtractor operable to combine early and late versions of the first subcarrier signal (SC1E and SC1L) into a first difference signal (SC1Diff);

a first multiplier (M17) for multiplying a programmable first data weighting factor ($\alpha$-data) with SC1Diff;

a second multiplier (M20) for multiplying the first data weighting factor ($\alpha$-data) with the prompt version of the first subcarrier signal (SC1P);

a second subtractor for combining the early and late versions of the second subcarrier signal (SC2E and SC2L) into a second difference signal (SC2Diff);

a third multiplier (M18) for multiplying a programmable second data weighting factor ($\beta$-data) with SC2Diff to generate a combined data sub-carrier SC_Ddata;

a fourth multiplier (M19) for multiplying the second data weighting factor ($\beta$-data) with the prompt version of the second subcarrier signal (SC2P);

a first adder for adding the outputs of the first and third multipliers (M17 and M18) to generate a combined difference data sub-carrier SC_Ddata for correlating with the baseband signal in the correlator module; and a second adder for adding the outputs of the second and fourth multipliers (M20 and M19) to generate a combined prompt data sub-carrier SC_Pdata for correlating with the baseband signal in the correlator module.

The subcarrier combining module further comprises:

a fifth multiplier (M13) for multiplying a programmable first pilot weighting factor ($\alpha$-pilot) with SC1Diff;

a sixth multiplier (M16) for multiplying the first pilot weighting factor ($\alpha$-pilot) with the prompt version of the first subcarrier signal (SC1P);

a seventh multiplier (M14) for multiplying a programmable second pilot weighting factor ($\beta$-pilot) with SC2Diff to generate a combined data sub-carrier SC_Dpilot;

a eights multiplier (M15) for multiplying the second pilot weighting factor ($\beta$-pilot) with the prompt version of the second subcarrier signal (SC2P);

a third adder for adding the outputs of the first and third multipliers (M17 and M18) to generate a combined difference pilot sub-carrier SC_Dpilot for correlating with the baseband signal in the correlator module; and a fourth adder for adding the outputs of the second and fourth multipliers (M20 and M19) to generate a combined prompt pilot sub-carrier SC_Ppilot for correlating with the baseband signal in the correlator module.

The acquisition and tracking apparatus as described above may further include a TMBOC Multiplexer module for dynamically assigning the weighting factors ($\alpha$-pilot, $\alpha$-data, $\beta$-pilot, $\beta$-data) to weighting factors received from a set of weighting factors (α, β weights), the assignments being controlled according to a specified pattern, the TMBOC Multiplexer module comprising:
- a pattern memory for storing the specified pattern;
- a pattern counter for cyclically addressing the pattern memory, the pattern counter being reset by the periodic interrupt and clocked by the effective code clock;
- a set of weight selectors being controlled by a data output of the pattern memory to select the weighting factors (α-pilot, α-data, β-pilot, β-data) from among the set of weighting factors (α, β weights) according to the pattern stored in the pattern memory.

The acquisitions and tracking apparatus described above may further comprise:
- a selector for selecting one of a plurality of available navigation signals in the form of wide band digitized intermediate frequency (IF) signals, for acquisition and tracking; and
- a customizable IF Filter for filtering out frequencies outside the frequency range of the selected navigation signal.

The acquisition and tracking apparatus, further comprising:
- an Accumulator Buffer, for coherently or non-coherently accumulating outputs of the correlator module;
- in the Discriminator Module, means for generating a set of combined data and pilot synchronization errors from the pilot and data correlations received from the Accumulator Buffer, the operation of the Discriminator Module being controlled by modulation type information received from a Parameter Parsing Module;
- a Dual Estimator Module, generating a Code Frequency Feedback signal for adjusting the code clock (CCK); and
- a set of Loop Filters for filtering the set of combined data and pilot synchronization errors to achieve loop stability and sending the filtered values to the Dual Estimator Module, and for sending a filtered carrier frequency feedback value to the numerically controlled local carrier oscillator.

According to another aspect of the invention, there is provided a global navigation satellite signal receiver system, comprising:
an acquisition and tracking apparatus for tracking a plurality of spread spectrum navigation signals, each modulated according to one of a set of modulation types on a high frequency carrier with a navigation message riding on a spreading code which comprises a combination of a primary data code component for carrying the navigation message; a primary pilot code component; secondary data and pilot code components; and a plurality of data and pilot subcarrier components, the apparatus comprising a plurality N of channel processors, each channel processor receiving a selected one of the navigation signals, and including:
- a code generation module generating local code replicas of code components of the spreading code of said selected signal;
- a carrier demodulation module, demodulating the carrier of said selected signal into a baseband signal;
- a code frequency generation module clocking the code generation module and generating local subcarrier replicas of subcarrier components of the spreading code of said selected signal;
- a subcarrier combining module combining the local subcarrier replicas to generate combined subcarrier replicas and multiplying said combined subcarrier replicas with weighting factors;
- a correlator module correlating the baseband signal with the local code replicas and the weighted combined subcarrier replicas into a set of correlation results; and
- a Local Interrupt Module receiving the correlation results therefrom and controlling the generating of the local code replicas and local subcarrier replicas.

According to yet another aspect of the invention, there is provided an acquisition and tracking apparatus for tracking a plurality of spread spectrum navigation signals, each modulated according to one of a set of modulation types on a high frequency carrier with a navigation message riding on a spreading code which comprises a combination of a primary data code component for carrying the navigation message; a primary pilot code component; secondary data and pilot code components; and a plurality of data and pilot subcarrier components, the apparatus comprising a plurality N of channel processors, each channel processor receiving a selected one of the navigation signals, and including:
- a code generation module generating local code replicas of code components of the spreading code of said selected signal;
- a carrier demodulation module, demodulating the carrier of said selected signal into a baseband signal;
- a code frequency generation module clocking the code generation module and generating local subcarrier replicas of subcarrier components of the spreading code of said selected signal;
- a subcarrier combining module combining the local subcarrier replicas to generate combined subcarrier replicas and multiplying said combined subcarrier replicas with weighting factors;
- a correlator module correlating the baseband signal with the local code replicas and the weighted combined subcarrier replicas into a set of correlation results; and
- a Local Interrupt Module receiving the correlation results therefrom and controlling the generating of the local code replicas and local subcarrier replicas.

A corresponding operation of the acquisition and tracking apparatus will be provided in the section "Detailed description of the embodiments of the invention" shown below.

Thus, an improved apparatus for acquisition and tracking of global navigation satellite system (GNSS) signals, a global navigation satellite signal receiver system employing the apparatus, and a corresponding method of operation have been provided.

BRIEF DESCRIPTION OF THE DRAWINGS

Embodiments of the invention will now be described, by way of example, with reference to the accompanying drawings in which.

DETAILED DESCRIPTION OF THE EMBODIMENTS OF THE INVENTION

Figure 1:
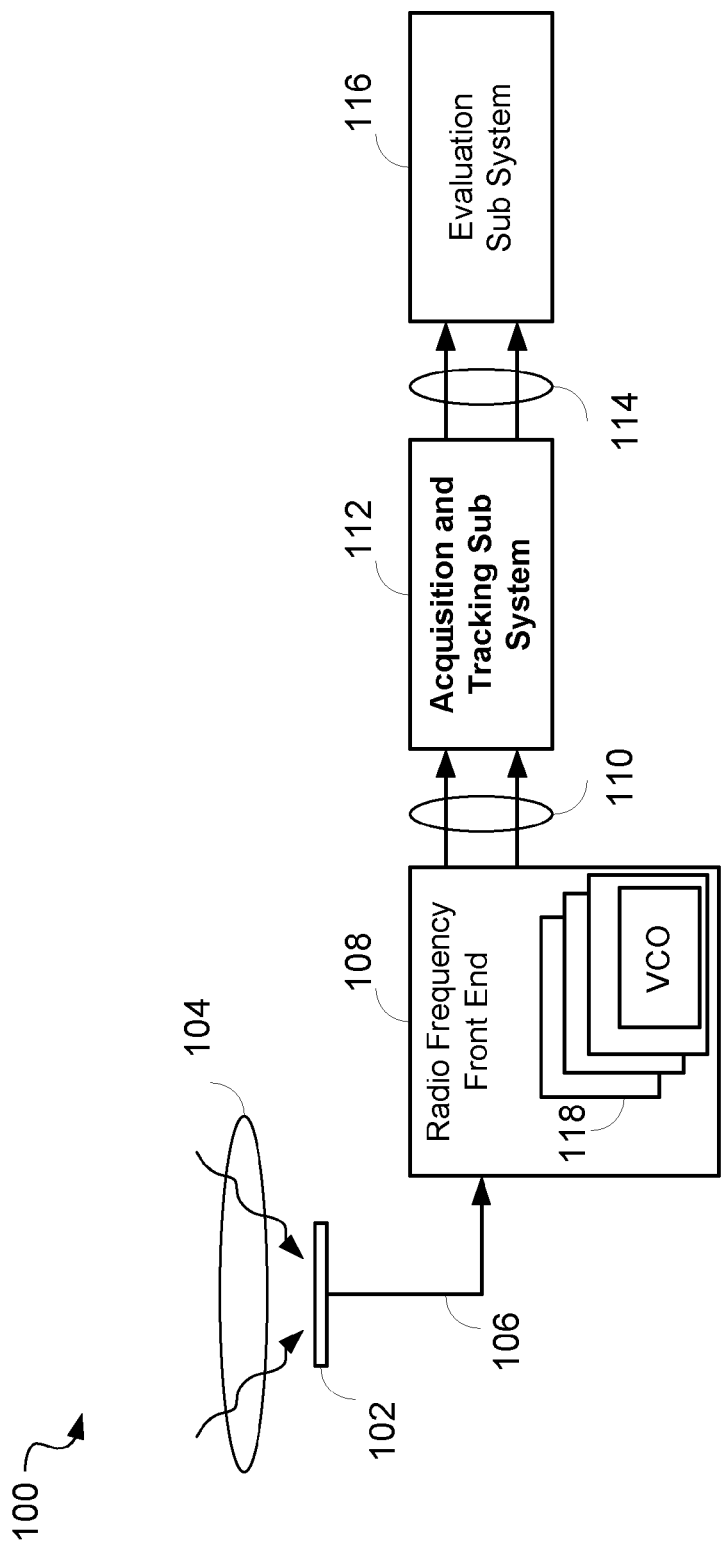
FIG. 1 shows an overall architecture of a Global Navigation Satellite Systems (GNSS) receiver 100.

The overall architecture of a Global Navigation Satellite Systems (GNSS) receiver 100 is illustrated in FIG. 1 showing an Antenna 102, which may capture a number of radio signals carrying navigation signals 104 on different frequencies from different satellites and deliver captured signals 106 to a Radio Frequency Front End 108. The Radio Frequency Front End 108 converts all captured signals 106 to intermediate frequency (IF) and outputs one or more digitized IF signals 110 which are processed in an Acquisition and Tracking Subsystem Apparatus 112 that delivers decoded navigation message bit streams and other data 114 to an Evaluation Subsystem 116. The Acquisition and Tracking Subsystem 112 will be also referred to as Acquisition and Tracking Apparatus 112 in this patent application.

The standard satellite radio frequencies used by the four different GNSSs are shown in Table 1. As it is well known, the GNSS receiver must receive and track several satellite signals on one or more different frequencies simultaneously. Although the navigation signals transmitted on the same frequency may be used by all satellites in the same navigation system, and the frequencies may be shared with satellite signals of other constellations, the signals are still distinguished by their modulation which includes spreading codes and optionally subcarrier modulation.

A function of the Radio Frequency Front End 108 is to down convert each received signal of interest to one of the digitized IF signals 110, all at a common different intermediate frequency (IF). For this purpose, the Radio Frequency Front End 108 may include three or more configurable superheterodyne converters, each optionally providing automatic gain control (AGC) and converting a captured radio signal to an intermediate frequency (IF) band with one of several, in this case shown as three Voltage Controlled Oscillators (VCO#1 to VCO#3). Each of the VCOs has a sufficient tuning range to convert signal frequencies as indicated in Table 1. For example, any or all signals from GPS satellites can be so received, as can all signals of GLONASS, Galileo, and COMPASS as well as those from regional and augmentation systems. Furthermore, signals from different GNSS satellites are capable of simultaneously being received and converted to a specific IF. For example, in a GPS application, signals in the L1 band centered at 1575.420 MHz, the L2 band centered at 1227.600 MHz, and the L5 band centered at 1176.450 MHz may be received and converted as three IF signals.

In one the preferred embodiment of the invention, the common IF is 15 MHz, and each IF signal is digitized at a 60 MHz sampling rate.

GNSS

TABLE 1

GNSS Frequency Assignments

| GNSS | Band | Central Frequency (MHz) | VCO#1 | VCO#2 | VCO#3 |
|---|---|---|---|---|---|
| GPS | L1 | 1575.420 | X | | |
| | L2 | 1227.600 | | X | |
| | L5 | 1176.450 | | | X |
| GLONASS | L1 | 1602.000 | X | | |
| | L1 | 1575.420 | X | | |
| | L2 | 1246.000 | | X | |
| | L3 | 1204.704 | | | X |
| | L5 | 1176.000 | | | X |
| Galileo | E1 | 1575.420 | X | | |
| | E5 | 1191.795 | | | X |
| | E5a | 1176.450 | | | X |
| | E5b | 1207.140 | | | X |
| | E6 | 1278.750 | | X | |
| COMPASS | B1-1 | 1561.098 | X | | |
| | B1-2 | 1589.740 | X | | |
| | B2 | 1207.140 | | | X |
| | B3 | 1268.520 | | X | |

The signal plan for the COMPASS system has recently been updated, as reported in Inside GNSS, "China Reveals Updated Compass/Beidou-2 GNSS Signal Plan," Inside GNSS Magazine, vol. 4, no. 5, Aug. 10, 2009, available at http://www.insidegnss.com/node/1624. While the description of the embodiment of the invention is based on the original COMPASS signal plan shown in Tables 1 and 2, the new signals are easily accommodated as they reuse currently supported frequencies and modulation types.

The Evaluation Subsystem 116, performs computations for extracting a global position from the decoded navigation message bit streams and other data 114, and may be included in a conventional or customized computer system that may also provide graphical user interfaces (GUI) and other applications. Details of the Evaluation Subsystem 116 are outside the scope of the present invention, which concerns the Acquisition and Tracking Subsystem 112.

Figure 2:
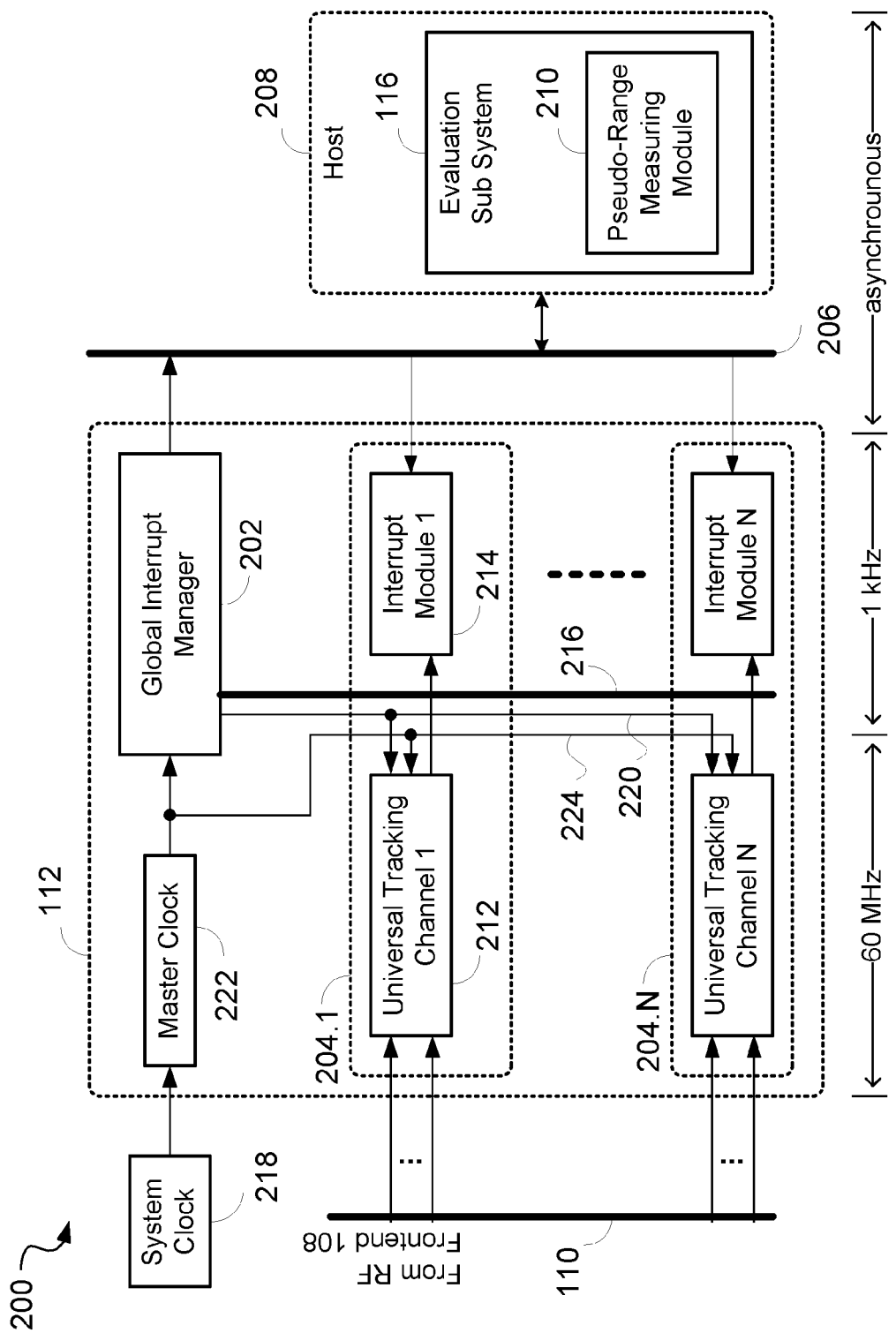
FIG. 2 shows a detailed block diagram 200 of the Acquisition and Tracking Subsystem 112 of FIG. 1, including a plurality of N Channel Processors 204.

FIG. 2 shows a more detailed block diagram 200 of the Acquisition and Tracking Subsystem 112 including a Global Interrupt Manager 202 and a plurality of N Channel Processors 204.1 to 204.N, each of which is connected to all of the digitized IF signals 110. The Acquisition and Tracking Subsystem 112 is connected over a processor interface bus 206 to a computer host 208 containing the Evaluation Subsystem 116, which may include a Measuring Module 210 using raw observation measurements. The processor interface bus 206 may be implemented as an actual interface bus or via a shared memory space in a synchronous dynamic random access memory (SDRAM) of the computer host 208. The inventor's development board contains an FPGA chip where the Acquisition and Tracking Subsystem 112 is implemented, as well as an SDRAM for communicating with the host 208, but all this processing could also work as pure software when DSP will be faster.

Each Channel Processor 204 is comprised of a Universal Tracking Channel 212, which receives preferably all of the digitized IF signals 110, and a Local Interrupt Module 214, coupled to the Universal Tracking Channel 212 over a common interface bus 216.

A system clock module 218 generates a common 60 MHz system clock used in the Radio Frequency Front End 108 for sampling the IF, and in the Acquisition and Tracking Subsystem 112 for clocking the digital circuitry in general.

According to a preferred embodiment of the invention, the Acquisition and Tracking Subsystem 112 is realized in a Field Programmable Gate Array (FPGA), with many DSP slices, programmable logic, and an embedded general purpose computer core, a Random Access Memory (RAM), e.g., a Virtex-4Q SX FPGA from Xilinx. Alternate embodiments could be implemented in an ASIC or in pure software running on any type of processor. The Acquisition and Tracking Subsystem 112 is realized in a Field Programmable Gate Array (FPGA), currently a Virtex-4Q SX FPGA from Xilinx corporation, which includes a large number of DSP48 cells slices, which are programmable logic digital signal processing (DSP)cells resources, a Random Access Memory (RAM), and an embedded soft-core 32-bit fixed-point processor with a RISC Harvard architecture, which is used as a general purpose computer core. Newer types of FPGA provide more resources, which would allow the instantiation of a larger number N Channel Processors 204, use a higher sampling frequency, and provide higher resolution, that is higher accuracy in code correlations. The Universal Tracking Channels 212 are implemented in a high speed hardware design running on the 60 MHz system clock that is also used to sample the digitized IF signals 110, whereas the functions of the Local Interrupt Modules 214 are implemented in interrupt handler software programs running on the computer core within the same FPGA. The local interrupts would occur nominally at a frequency of exactly 1 kHz corresponding to a 1 ms integration period determined by the spreading code length. But the 1 ms integration period may vary slightly for each channel as a result of the Doppler effect on spreading code rate. It is also understood that different nominal frequencies and corresponding integration periods are also possible.

The Acquisition and Tracking Subsystem 112 (i.e. the Global Interrupt Manager 202 and the Local Interrupt Modules 214), when realized in an FPGA, may contains Software defined functions that are written in a high level language, e.g., the C language, compiled into a binary load, transferred into a program memory accessed by the FPGA, and executed in the Local Interrupt Modules 214 by running in a microprocessor embedded block of the FPGA. It is understood that hHardware functions which are realized in the Universal Tracking Channels 212 may be called "firmware" since the hardware components of the FPGA may be programmed using the VHDL language for example. VHDL stands for VHSIC hardware description language, where VHSIC stands for very-high-speed integrated circuit. The VHDL program that defines the hardware functionality may then be compiled into a configuration load used to program the physical FPGA. Downloading individual firmware functions (patching the FPGA) needs access from a computer (or a network) for storing/updating the configuration load that is stored in a flash memory in the FPGA. No FPGA reprogramming should be required for the Universal Channel, as it is future compliant, although signal definition in configuration files may be dynamically updated as specification updates are released.

The overall operation of the GNSS receiver 100 is briefly described with the help of FIG. 2. Each digitized IF signal 110 may include several Code Division Multiple Access (CDMA) signals that were modulated into this frequency by satellites.

While the GNSS signals from different satellites have in common a nominal periodicity of 1 ms, or a multiple thereof, they generally arrive out of phase with each other at different Universal Tracking Channel 212. Each Universal Tracking Channel 212 derives internally a local 1 ms time frame (Code Epoch) from the signal being tracked, and dumps the accumulated correlation values at the end of each full or partial Code Epoch. At the same time, the time stamps (System Clock and Globallms counters) are latched. This information is used as depicted in FIG. 3A below.

On the other hand, a Master Clock module 222 generates a Globallms signal (global interrupt pulse) 224 that is independently derived from the 60 MHz System clock and triggers the Global Interrupt Module 202 as well as the N Universal Tracking Channels 212's internal state latches.

At the end of each Globallms 224 time interval indicated by the Master Clock module 222, the Global Interrupt Manager 202 sequentially collects accumulated data from each Universal Tracking Channel 212 over the common interface bus 216 and forwards (synchronously captured) data to the host 208 over the processor interface bus 206.

There could be 0, 1 or 2 local interrupts from the Universal Tracking Channel 212 within one global interrupt period of the Global Interrupt Manager 202, i.e. the Globallms pulse. The Doppler phenomenon is responsible for having 0 or 2 interrupts within one global interrupt.

There is an "epoch skip" mechanism involving additional buffering and software to manage this which is not further described.

Each Channel Processor 204 may be independently configured by the Evaluation Subsystem 116 to select one of the digitized IF signals 110 to acquire and track one of the Code Division Multiple Access (CDMA) signals within the selected digitized IF signal 110. The results from each Channel Processor 204 include a navigation message that was modulated on the signal indicating time and position of the satellite, and the recorded time stamp. These results are collected periodically by the Global Interrupt Manager 202, and transmitted to the Evaluation Subsystem 116 for further computations, such as a propagation time (i.e. pseudo-range) indicating the distance of the receiver from the satellites.

In addition, the Pseudo-Range Measuring Module 210 allows the Evaluation Subsystem 116 to conduct specific measurements related to pseudo-range and phase measurements, including performance tests, on any signal by collecting detailed signal information (see Variable Spacing Correlation below).

It is appreciated that there is a common design for all Channel Processors 204, each with the same features and capabilities provided by their respective Universal Tracking Channels 212 and Interrupt Modules 214, which are configured individually and selectively by the Evaluation Subsystem 116 to acquire and track different GNSS signals. GNSS signals from different satellites may be received in the same frequency band but are distinguished from one another by their individual CDMA codes, which make them "different" signals to be acquired and tracked by different Channel Processors 204. Moreover, Frequency Domain Multiplexing Access (FDMA) is used in the GLONASS system, whose satellites all share the same spreading code, but have spectral diversity through this FDMA scheme.

Applicable Interface Control Document (ICD) are:
"Naystar GPS Space Segment/User Segment L5 Interfaces" 2005, "Navstar GPS Space Segment/Navigation User Interfaces" 2006, and "Navstar GPS Space Segment/User Segment L1C Interfaces" 2008, all published by ARINC Engineering Services;

"Galileo Open Service Signal In Space Interface Control Document, Draft 1" 2008 published by the European Space Agency and European GNSS Supervisory Authority; and "GLONASS Interface Control Document" 2002 published by the Coordination Scientific Information Center.

No ICD is available for COMPASS, but the following article by Chen, Alan, David De Lorenzo, Grace Xingxin Gao, Per Enge and Sherman Lo. 2007, « GNSS Over China: The Compass MEO Satellite Codes », Inside GNSS Magazine, vol. 2, no. 5 (July/August), p. 36-43 contains partial information on the actually transmitted signal.

Table 2 lists the open service civilian (non-military) GNSS signals that are freely available (without subscription) world wide in existing and proposed GNSS signals. For each system type (GPS, Galileo, GLONASS, and COMPASS), the number of satellites (#S), the frequency bands used, and civilian signal names are listed. For each civilian signal, its modulation type is listed as well as the corresponding length of the primary and secondary codes (number of chips) and secondary chip to primary code ratio.

TABLE 2

Civil GNSS Signal Summary

| System | #S | Band (MHz) | Civilian Signal | Modulation Type | Code Length (chip) primary | sec'y | ratio |
|---|---|---|---|---|---|---|---|
| GPS | 32 | L1: 1575.42 | L1 C/A | BPSK(1) | 1023 | 0 | 0 |
|  |  |  | L1C-I | BOC(1, 1) | 10230 | 0 | 0 |
|  |  |  | L1C-Q | TMBOC(6, 1, 4/33) | 10230 | 1800 | 1:1 |
|  |  | L2: 1227.60 | L2CM | TMBPSK(1/2, 1/2) | 10230 | 0 | 0 |
|  |  |  | L2CL |  | 767250 | 0 | 0 |
|  |  | L5: 1176.45 | L5-I | QPSK(10) | 10230 | 10 |  |
|  |  |  | L5-Q |  | 10230 | 20 |  |
| Galileo | 30 | L1: 1575.42 | E1B | CBOC(6, 1, 1/11, +) | 4092 | 0 | 0 |
|  |  |  | E1C | CBOC(6, 1, 1/11, −) | 4092 | 25 | 1:1 |
|  |  | E5a: 1176.45 | E5a-I | QPSK(10) AltBOC(10) | 10230 | 20 | 1:1 |
|  |  |  | E5a-Q |  | 10230 | 100 | 1:1 |
|  |  | E5b: 1207.14 | E5a-I | QPSK(10) | 10230 | 4 | 1:1 |
|  |  |  | E5b-Q |  | 10230 | 100 | 1:1 |
| GLONASS | 24 | L1g: 1602.00 | L1OF | BPSK(1/2) - FDMA | 511 | 30 | 10:1 |
|  |  | L1: 1575.00 | L1ROC | BOC(2, 2) |  |  |  |
|  |  | L2g: 1246.00 | L2OF | BPSK(1/2) - FDMA | 511 | 30 | 10:1 |
|  |  | L5: 1176.00 | L5OF | BPSK(4) - FDMA |  |  |  |
|  |  | L3: 1204.704 | L3ROC | BOC(4, 4) |  |  |  |
| COMPASS | 30 | E1: 1561:098 | B1-1:C/A (I) | BPSK(2) | 2046 | 20 | 1:1 |
|  |  | E5b: 1207.14 | B2: C/A (I) | BPSK(2) | 2046 | 20 | 1:1 |
|  |  | B3: 1268.52 | B3: C/A (I) | BPSK(10) | 10230 | 20 | 1:1 |

The "Specification for the Wide Area Augmentation System (WAAS)" 2001 document DO-299C published by the U.S. Department of Transportation Federal Aviation Administration, describes a geo-stationary satellite system whose signals use the same frequency bands and modulation types as the GPS L1-L5 signals. Consequently, WAAS signals and signals of any other compliant Satellite/Ground Based Augmentation System (SBAS/GBAS) as well as Regional systems can also be decoded by the Channel Processor 204.

As defined in the respective ICDs, common characteristics of the various GNSS signal formats include, a high carrier frequency modulated simultaneously with multiple layers of digital coding: a navigation message riding on primary and secondary CDMA codes (spreading codes) but not all data components have a secondary code, and optionally one or more digital (square) subcarriers. The CDMA codes may be augmented in parallel or time multiplexed with CDMA pilot codes (with various schemes of relative phase relations) that do not carry navigation message data. In addition a FDMA regime is used in GLONASS in which different satellites use the same CDMA codes, but different radio frequencies within a fairly narrow range although antipodal satellites share the same frequencies since, on the Earth surface, only half of them are visible. The invention of the universal acquisition and tracking channel is based on an exploitation of this superficial similarity of the different GNSS signal formats as well as the formats of augmentation and regional systems by reusing many of the same configurable hardware components to efficiently meet the specific requirements of each signal format.

Considering the large number civilian GNSS RF signal components (614 in the year 2009 are listed in Table 2, the number would be even greater if regional and augmentation systems were also considered) that are available worldwide, almost half of which could be visible to a user at any given time, the importance of reducing the total complexity and reusing as many resources as possible is very desirable, as are robustness and precision of the solution. Indeed, dedicated channels would remain unused if their targeted signal was unavailable, thus wasting power without any outcome.

Worldwide, GNSS includes GPS, GLONASS, Galileo and COMPASS. All these systems spread their message with a higher rated Pseudo-Random Noise (PRN) code, which is then transmitted at Radio Frequency (RF) according to a Binary Phase Shift Keying (BPSK), Quadrature PSK (QPSK) or one of the variations of Binary Offset Carrier (BOC) modulation. These satellite constellations, or even networks of ground-based transmitters, broadcast different signals on more than one frequency to help reduce the impact of ionospheric delay on the solution and improve their immunity to in-band interference. Center frequencies cover about 1.1-1.6 GHz of the L-band, although other bands may also be considered in the future. For example, there are already plans for Galileo signals in the C-band.

Knowing that the message is spread with a unique key, multiple messages can be transmitted simultaneously over the same frequency. This technique is known as Code Division Multiplexing Access (CDMA). On the other hand, GLONASS currently uses the same spreading code for all its satellites, for both L1 and L2, but relies on a frequency separation for simultaneous transmissions. This is referred to as Frequency Domain Multiplexing Access (FDMA). GLONASS's modernization plans include adding CDMA-based signals in the L1 and L5 bands, as well as a new FDMA signal on L3, all of which are listed in G. Gibbons, "GLONASS—A New Look for the 21st Century," Inside GNSS: Integrity Beyond RAIM, Beyond GPS, vol. 3, pp. 16-17, May/June 2008.

Because coherent integration provides better post-correlation Signal to Noise Ratios (SNR) than non-coherent integration, where navigation bit (or secondary chip) removal introduces squaring losses, the present invention is based on coherent integration with a 1 ms integration period. Subsequent processing can then combine correlator outputs, coherently or not, in order to accommodate other schemes.

Satellite navigation is increasingly and widely used, and potential applications now include indoors navigation, as well as in other hostile environments where the SNR is far from ideal. To address this issue, most new signals will include an additional data-free pilot component (in phase or in quadrature with the data component) allowing for long integration times that are then only limited by the Doppler effect and the local oscillator's stability, which alters the received frequency according to the user-satellite Line Of Sight's (LOS) dynamics. Also, time-multiplexing (TM) of codes provides another way of combining Data and Pilot components, for example in the GPS L2C signal.

Moreover, higher chipping rates are used to increase the signal's Root Mean Square (RMS) bandwidth (also referred to as the Gabor bandwidth), which makes it more resistant to interferences. Such higher rates imply a higher sampling frequency and shorter correlator spacing than for GPS L1 C/A, for example.

Having higher chipping rates easily allows for longer spreading codes, although it requires greater integrate and dump registers, if integration over longer periods were to be considered. Longer codes have better cross-correlation isolation, which reduces the cross-correlation noise. Longer period codes also have the benefit of reducing the propagation time's integer ambiguity. The propagation time for GPS satellites on L1 for example varies from about 60 ms at the zenith to 80 ms at the horizon. Hence, the longer the code duration, the smaller the resulting ambiguity becomes within that 20 ms difference. To further improve this characteristic, secondary codes are added to the primary spreading codes, artificially making them longer (while improving the cross-correlation protection). Note that longer coherent integration times mentioned above assume that the secondary code is known and synchronized.

Most new signals are based on the BOC modulation family, which splits the BPSK spectrum into two, shifting its two main lobes towards each edge of the frequency band, thus improving the RMS bandwidth for a given chipping rate. This is due to a fourth component in the modulation scheme (i.e. on top of the carrier, the primary and secondary codes, and the message): the square sub-carriers. There are different flavors of modulations (defined by the sub-carriers rate, the chipping rate, and the data/pilot combination), such as the Modified BOC (MBOC), which is defined as a spectrum (G) involving BOC(1,1) and BOC(6,1) components in a 10 to 1 power ratio:

$$G_{MBOC}(f) = {}^{10}\!/_{11} G_{BOC_{(1,1)}}(f) + {}^{1}\!/_{11} G_{BOC_{(6,1)}}(f) \quad (1)$$

According to information published on line by ARINC, "Naystar GPS Space Segment/User Segment L1C Interfaces," IS-GPS-800, 2006, the GPS L1C can be described as:

$$s_{L1C_D}(t) = PC_{L1C_D}(t) \cdot D(t) \cdot BOC_{(1,1)}(t)$$

$$s_{L1C_P}(t) = \sqrt{3} PC_{L1C_P}(t) \cdot SC_{L1C_P}(t) \cdot TMBOC_{(6,1,4/33)}(t)$$

$$s_{L1C} = s_{L1C_D} + s_{L1C_P} \quad (2)$$

With the Primary Code (PC), Secondary Code (SC), navigation data (D) and Time-Multiplexed BOC (TMBOC) modulation, defined as:

$$TMBOC_{(6,1,4/33)}(t) = \alpha(t) \cdot BOC_{(1,1)}(t) + \beta(t) \cdot BOC_{(6,1)}(t) \quad (3)$$

$$\alpha(t) = \begin{cases} 1, & t \in 29/33 \\ 0, & t \in 4/33 \end{cases}$$

and $$\beta(t) = \begin{cases} 0, & t \in 29/33 \\ 1, & t \in 4/33 \end{cases}$$

As published in Galileo ICD/D.0, "Galileo Open Service GAL OS SIS ICD/D.0," Galileo Joint Undertaking 2006, the Galileo E1 signal is:

$$s_{E1-B}(t) = PC_{E1-B}(t) \cdot D(t) \cdot CBOC_{(6,1,1/11,+)}(t) \quad (4)$$

$$s_{E1-C}(t) = PC_{E1-C}(t) \cdot SC_{E1-C}(t) \cdot CBOC_{(6,1,1/11,-)}(t)$$

$$s_{E1} = \frac{1}{\sqrt{2}}[s_{E1-B} - s_{E1-C}]$$

With the Complex BOC (CBOC) modulation:

$$CBOC_{(6,1,1/11,\pm)}(t) = \sqrt{{}^{10}\!/_{11}} BOC_{(1,1)}(t) \pm \sqrt{{}^{1}\!/_{11}} BOC_{(6,1)}(t) \quad (5)$$

Finally, there is also the more complex Alternate BOC (AltBOC). Because of its large bandwidth, it may be dealt with as two independent QPSK signals on two different frequencies E5a and E5b, as listed in Table 2.

The maximum Doppler frequency shifts for a static receiver are in the ranges of approximately 3000 to 5300 Hz for carrier, up to 32 Hz for the code, and up to 19 Hz for the sub-carrier components of the signals as is described in detail in "Development of a Universal GNSS Tracking Channel" by Fortin, Marc-Antoine, Jean-Christophe Guay et René Jr. Landry, 2009 in Proceedings of the 22nd International Technical Meeting of the Satellite Division of the Institute of Navigation ION GNSS 2009 (Savannah, Ga., Sep. 22-25, 2009) p. 259-272, Institute of Navigation, Fairfax, Va. 22030, United States. Although different orbits, frequencies and modulations are used in the different GNSS signals, the Doppler impact remains similar for all constellations.

Assuming that there are as many RF front-ends as there are GNSS center frequencies (or that a RF direct sampling solution is available), it is then possible to track any civil GNSS signal with the Universal Tracking Channel 212. Actually, three Voltage Controlled Oscillators (VCO) in the RF front-ends can cover the 10 different GNSS frequencies, as has been described in Table 1 above. Note that additional frequencies are supported although they are not yet in use: E5 is broken down into E5a and E5b while E6 and B1-2 are not freely accessible. Hence, with the Universal Tracking Channel 212, any civil GNSS signal detailed in Table 2 above, in addition to all publicly known signals of regional and augmentation systems, may be received, provided they are broadcast.

In summary, although there is similarity between the various GNSS signals, the task to decode all these signals with a single design, i.e. the universal acquisition and tracking channel of the invention necessitates taking into account all these particularities.

Figure 3:
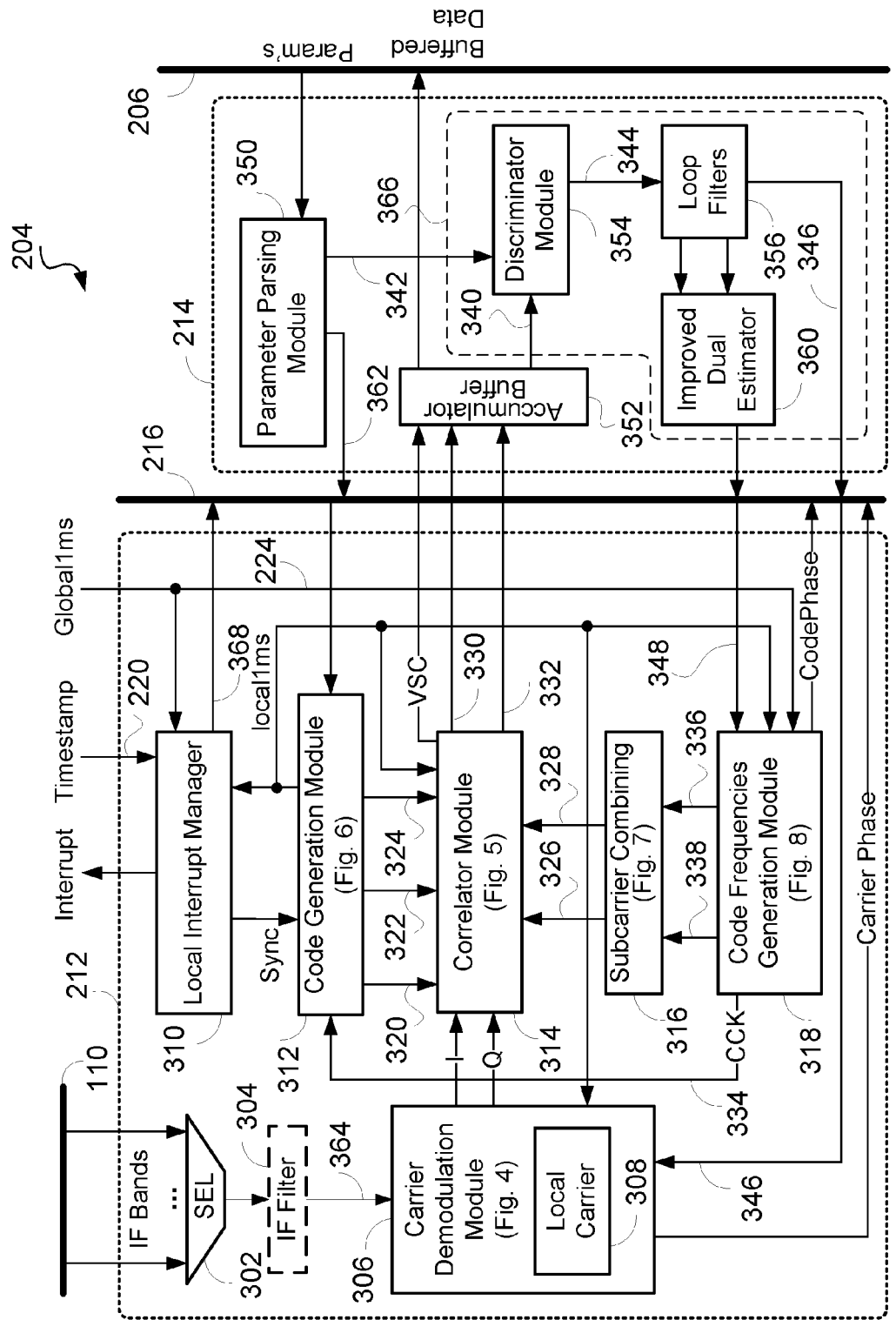
FIG. 3 shows a simplified block diagram of the Channel Processor 204 of FIG. 2, which comprises a Universal Tracking Channel 212 including a customizable IF Filter 304, a Carrier Demodulation Module 306, a Code Generation Module 312, a Correlator Module 314, Subcarrier Combining Module 316, and a Code Frequencies Generation Module 318.
Figure 3A:
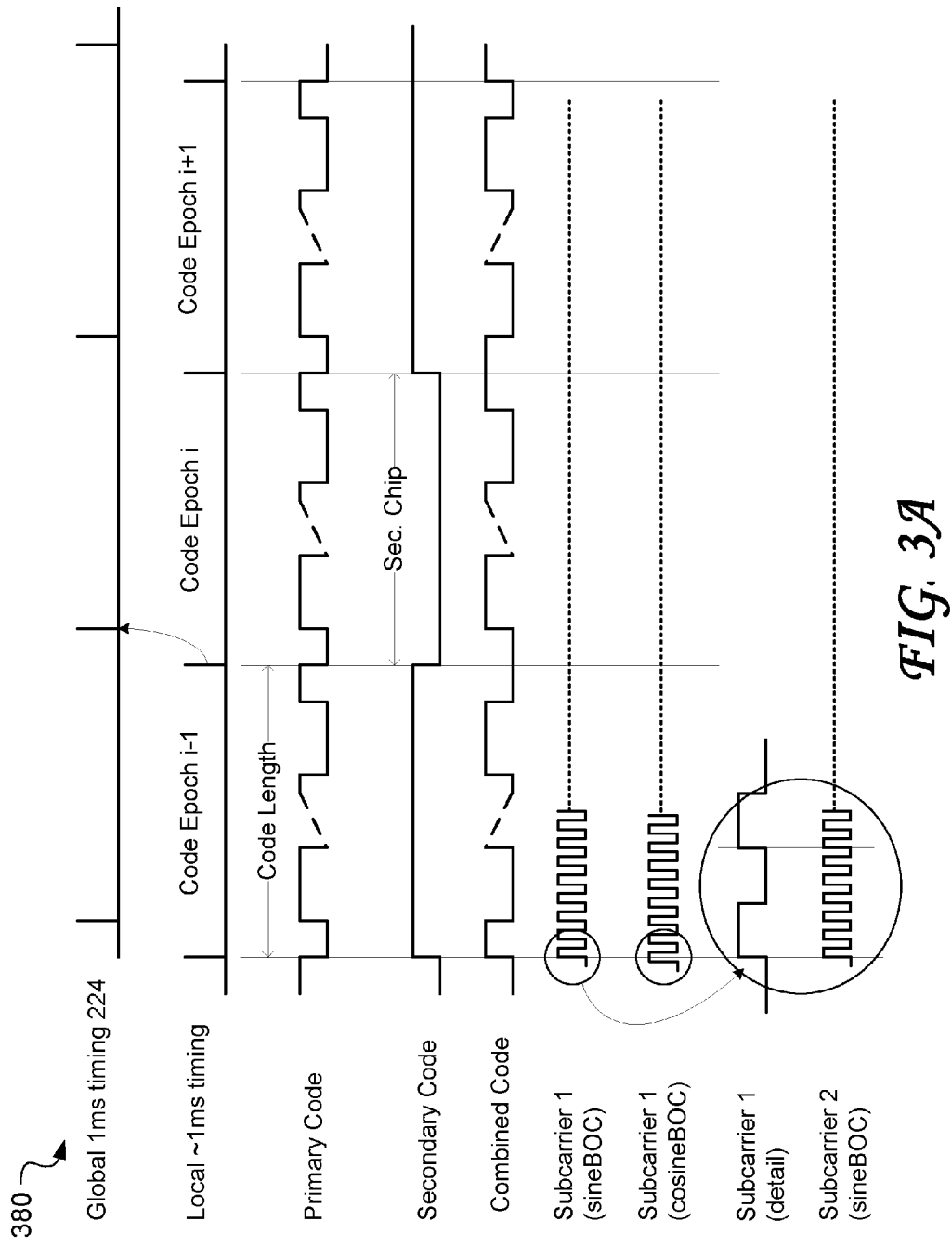
FIG. 3A shows a timing diagram 380 of signal components of a typical complex GNSS signal.

FIG. 3 shows a simplified block diagram of the Channel Processor 204, including the Universal Tracking Channel 212 coupled to the corresponding Local Interrupt Module 214 over the common interface bus 216. The Local Interrupt Module 214 is also connected to the processor interface bus 206.

The Universal Tracking Channel 212 comprises a Band Selector 302, an optional customizable IF Filter 304, a Carrier Demodulation Module 306 including a local Carrier Generator 308, a Local Interrupt Manager 310, a Code Generation Module 312, a Correlator Module 314, a Subcarrier Combining Module 316 and a Code Frequencies Generation Module 318.

The Local Interrupt Module 214 comprises a Parameter Parsing Module 350, an Accumulator Buffer 352, a Discriminator Module 354, a set of three Loop Filters 356, and an Improved Dual Estimator Module 360.

The overall function of the Channel Processor 204 includes:
  through the Parameter Parsing Module 350, programming the Universal Tracking Channel 212 over the common interface bus 216 with a set of operational parameters 362 specific to the processing of a selected GNSS signal;
  in the Band Selector 302, selecting a selected IF signal 364 from the digitized IF signals 110, and optionally adjusting its bandwidth with the optional customizable IF Filter 304 which is a digital filter, to reduce noise and interference;
  in the Carrier Demodulation Module 306, demodulating the selected IF signal 364 to extract demodulated "I" and "Q" components with the local Carrier Generator 308 which receives a carrier frequency control signal 346 which is formed by the addition of a nominal value received from the Parameter Parsing Module 350 and includes a feedback component from one of the Loop Filters 356, to generate a local carrier signal, and outputs a Carrier Phase measurement value to the common interface bus 216;
  in the Correlator Module 314, correlating the "I" and "Q" components with spreading codes in the form of a set of pilot spreading codes 320, a set of data spreading codes 322, and a variable spacing "M_tap" code 324 from the Code Generation Module 312, as well as with combined pilot and data sub-carriers 326 and 328 respectively from the Subcarrier Combining Module 316, to generate a set of pilot correlations 330, a set of data correlations 332, and a variable spacing correlation (VSC);
  in the Code Generation Module 312, based on specific parameters from the set of parameters 362 generating the set of pilot codes 320, the set of data codes 322, a local1ms pulse, and the variable spacing "M_tap" code 324, with timing provided by a code clock (CCK) 334;
  in the Subcarrier Combining Module 316, combining a set of subcarrier signals 336 and a set of subcarrier weighting factors 338 to generate the combined pilot and data sub-carriers 326 and 328;
  in the Code Frequencies Generation Module 318, using parameters from the set of parameters 362, including a Code Frequency Control signal, in generating the specific required subcarrier signals 336 and subcarrier weighting factors 338, as well as generating the code clock 334, and outputting a Code Phase to the common interface bus 216;
  in the Accumulator Buffer 352, coherently or non-coherently accumulating the sets of pilot and data correlations 330 and 332, and the VSC for synchronizing the correlation and forwarding the accumulated values, to the host 208 over the processor interface bus 206, as well as forwarding accumulated pilot and data correlations 340 to the Discriminator Module 354;
  in the Discriminator Module 354, generating a set of combined data and pilot synchronization errors 344 from the forwarded pilot and data correlations, controlled by modulation discriminator type information 342 received from the Parameter Parsing Module 350;
  in the Loop Filters 356 which may be implemented as programmable Infinite Impulse Response (IIR) filters, low-pass filtering the set of combined data and pilot synchronization errors 344 to achieve loop stability, and sending the feedback component of the carrier frequency control signal 346 (which includes the feedback value generated by one of the Loop Filters 356) to the Carrier Demodulation Module 306 thus closing a phase lock loop that regulates the frequency of the local Carrier Generator 308 with the frequency of the selected IF input signal 364; and
  in the Improved Dual Estimator Module 360, generating a Code Frequency Feedback signal 348, including a ClockReset signal and a Feedback Component which is merged (in the Code Frequencies Generation Module 318) with a code frequency control signal (from the set of parameters 362), the Code Frequency Feedback signal 348 for adjusting the frequency generated in the Code Frequencies Generation Module 318, thus closing a delay lock loop that synchronizes the code clock (CCK) 334 with the spreading code carried in the demodulated signals "I" and "Q", and the ClockReset signal for providing the reset that is required for resolving a sub-carrier integer ambiguity in the Code Frequencies Generation Module 318.

Note that, while not explicitly shown in FIG. 3, latching of the sets of pilot and data correlations 330 and 332 is done within the Universal Tracking Channel 212 with a dedicated set of hardware registers for later access by the Global Interrupt Manager 202. These registers latch the 16 MSB of partial sums accumulated in the sets of pilot and data correlations 330 and 332 with the local1ms pulse, in order not to lose the data because these accumulators reset and will start accumulating again. Then software in the Accumulator Buffer 352, comprising computer readable code stored in a computer readable medium such as memory, gets around very soon, at least before the next local1ms pulse, to read these registers, and process the partial sum, e.g. to square and/or accumulate for the selected coherent and non-coherent integration time of the signal.

FIG. 3A shows a timing diagram 380 of signal components of a typical complex GNSS signal, including a Primary Code, a Secondary Code, a Subcarrier 1, and a Subcarrier 2, each signal components being of a different periodicity but have a phase relation with each other. Each repetition of the Primary Code is nominally of a duration of a multiple of 1 ms shown in a Local ~1 ms timing scale. Successive 1 ms periods are also referred to as Code Epochs, given "full interrupts" occur at ~1 ms intervals. The actual duration of a Code Epoch may vary slightly due the Doppler effect associated with the relative movement of the satellite and the receiver. FIG. 3A illustrates the structure of a typical complex GNSS signal, the same structure applies to the code and sub-carrier replica signals that are generated locally and with which the received GNSS signal is correlated. An aspect of the present disclosure is the accurate generation of these replicas and corresponding local epochs, which essentially correspond to the received signal code epochs during the corresponding GNSS signal tracking phase.

In the example of FIG. 3A, the Primary Code has a nominal duration of 1 ms corresponding to a code length of 1023 or 10230 primary code chips, depending, for example, on the signal type (see Table 2). When Secondary Code is present (see Table 2), it will start at the same time as the Primary Code. Because the Secondary Code is slower, it takes more time to complete. Upon completion of the Secondary Code, the Primary Code has repeated an integral number of times and finishes on the Secondary Code boundary, as illustrated in FIG. 3A. The Primary and Secondary Codes are edge synchronous with one another. The effect of the Secondary Code is illustrated in the Combined Code waveform which shows the Primary code XORed with the Secondary Code. The navigation message is implemented in a similar fashion to the Secondary Code, except that the navigation message is applied to the combined code waveform above. It is intentionally omitted in FIG. 3A, for clarity.

Figure 8:
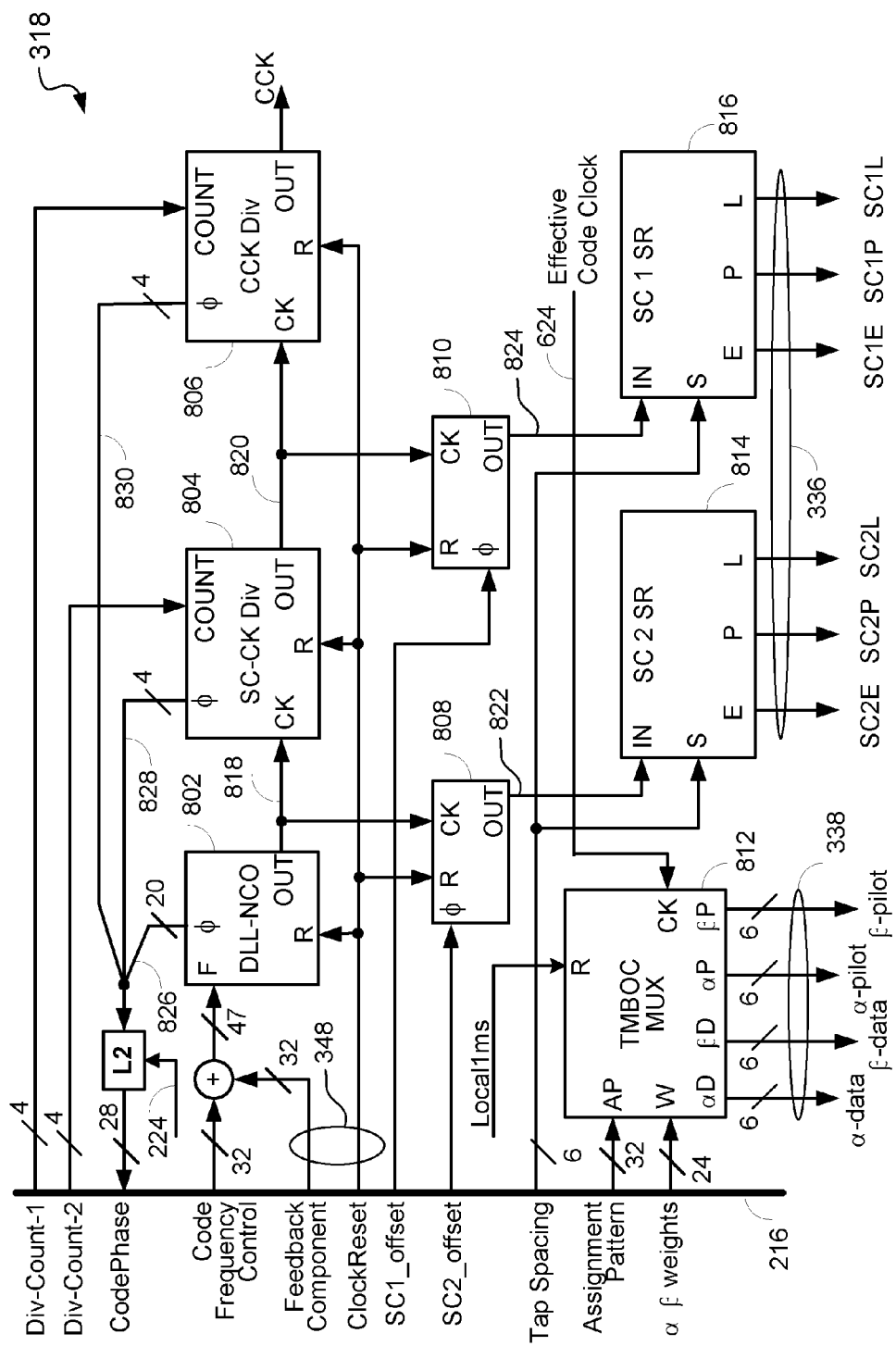
FIG. 8 shows a block diagram of the Code Frequencies Generation Module 318 of FIG. 3, including a TMBOC Multiplexer 812.

The signal may also include a square wave subcarrier (Subcarrier 1), which may have coincident edges (sineBOC) or in 90 degrees offset (cosineBOC) position relative to the Primary Code chips, as illustrated in the respective Subcarrier 1 waveform. This timing relationship between the Primary Code and the Subcarrier waveforms is the reason why it is possible and advantageous, to derive the CCK frequency by dividing the frequency of the subcarrier, as described in more detail below (FIG. 8).

The signal may also include a second square wave subcarrier (Subcarrier 2) at a frequency which is a multiple of the frequency of Subcarrier 1. Illustrated is a sineBOC Subcarrier 2 waveform. Not shown in FIG. 3a is a cosineBOC version of the Subcarrier 2.

Referring back to FIG. 3, the general method of tracking a particular GNSS signal is to generate in the Code Generation Module 312 and in the Code Frequencies Generation Module 318, replicas of the codes and subcarriers respectively corresponding to the codes and subcarriers that are modulated by the satellite in the signal being tracked. The replicas are then correlated with the in-phase ("I") and quadrature ("Q") carrier in the Correlator Module 314; the resulting pilot and data correlations 330 and 332 are processed in separate channels or, as in the preferred embodiment of the invention, in a single Universal Tracking Channel 212. This dual-channel processing allows generating, in common for the pilot and the data codes, the feedback component of the carrier frequency control signal 346, as well as (in the Improved Dual Estimator Module 360) the Code Frequency Feedback signal 348. In the preferred embodiment of the invention, the Code Frequency Feedback signal 348 also includes the ClockReset signal (see above).

The local 1ms interrupt signal (the local1ms pulse) is generated by the Code Generation Module 312 in each Universal Tracking Channel 212: it triggers the transfer of the latched pilot and data correlations 330 and 332 to the Accumulator Buffer 352, and the execution of software programs in the associated Local Interrupt Module 214, such as the Discriminator Module 354, the Loop Filter Module 356 and the Improved Dual Estimator Module 360, for example.

A number of design details for a GNSS receiver for GPS and Giove-A (the fore-runner of Galileo), relating to methods for BPSK and BOC(1,1), may be found in the Master's thesis of B. Sauriol, "Mise en oeuvre d'un en temps réel d'un récepteur hybride GPS-Galileo," in Génie électrique, maîtrise Montréal: École de Technologies Supérieure, 2008, entire contents of which is incorporated herein by reference.

Concerning the implementation of the Discriminator Module 354 and the Loop Filters 356, any state-of-the-art discriminator type, e.g., FLL, PLL or DLL, may be used in the Local Interrupt Module 214. For a list of FLL, PLL and DLL discriminators with loop filters of configurable order 0, 1, and 2, please refer to Chapter 5 "Satellite Signal Acquisition, Tracking, and Data Demodulation" by Phillip W. Ward, NAVWARD GPS Consulting, John W. Betz and Christopher J. Hegarty, the MITRE Corporation, in "Understanding GPS Principles and Applications", Artech House, ISBN: 1-58053-894-0, obtainable from http://www.navtechgps.com/Shop/books/professionals_startin_out/understanding_gps_principles_and_applications_1024.asp In acquisition mode, the same code may be used in data and pilot components to reduce acquisition time by half: the acquired signal component is either data or pilot. The parameter $\beta=0$ for all types of MBOC. In fact, in the Pilot Code Memory, 608, the code is circularly shifted by half its length to test the two different code delays simultaneously (through data and pilot components), thus reducing the dwell time spent for every Doppler bin by one half.

In tracking mode, there are basically 2 ways to combine data and pilot components:
1) the correlator measurements are combined according to their relative phase relation before a single discriminator is computed and
2) the outputs of both discriminators are computed independently before combining their results.

Both options are user selectable in the Discriminator Module 354.

The host 208 commands configuration of the Radio Frequency Front End 108. Parameters for the Universal Tracking Channel 212 are controlled by the host 208 and expanded by the Parameter Parsing Module 350 for loading into, configuring, or enabling various blocks in the modules of the Universal Tracking Channel 212, according to the desired modulation type and other parameters of the specific signal to be tracked:

(a) setting the Band Selector 302 to the selected IF signal 364 from a specific IF input;

(b) setting the optional customizable IF Filter 304 to match the frequency and bandwidth of the received signal;

(c) setting the Carrier Demodulation Module 306 to the center frequency of the received signal;

(d) preparing the Code Generation Module 312 to generate the desired pilot and data spreading codes (320, 322) which include the primary codes XORed with the secondary codes;

(e) setting the Code Frequencies Generation Module 318 to generate the appropriate sub-carrier frequencies, if applicable, and generate the Code Clock (CCK);

(f) selecting sine or cosine phases and weights for the sub-carriers, if applicable; and (g) setting the Discriminator Module 354 according to the modulation type and desired data/pilot combination type.

Note that a GLONASS signal is selected by setting the optional customizable IF Filter 304 and the Carrier Demodulation Module 306 to the desired frequency within the selected IF band in steps (b) and (c) respectively.

In the following FIGS. 4-9, the major building blocks of the Universal Tracking Channel 212 are expanded and described in further detail.

According to a preferred embodiment, the Universal Tracking Channel 212 is a fully digital synchronous design driven by the 60 MHz system clock signal.

Generally speaking, logic function stages such as multipliers which process inputs synchronously to generate outputs may include an edge triggered register before serving the outputs to subsequent stages, a design technique that is well known to practitioners in the field of digital design. For simplicity of the description however, these circuit details are not illustrated. Also, although several signals are here described as "clocks", but they are actually implemented as enable logic signals at the circuit level. Similarly, a technique that is associated with synchronous retiming in function stages is to insert needed additional retiming stages in some signals to equalize their delay (in terms of the number of 60 MHz clock periods), with the delays of other signals that are retimed. In order not to clutter the description and the drawings, such details are sometimes not illustrated.

The number of bits indicated for many of the signals shown in the following FIGS. 4-9 are presented as representative of the preferred implementation of the invention, and should not be interpreted as limiting.

The universal aspect of the Universal Tracking Channel 212 requires two implementation features, (a) the provision of functional elements for performing the required operations for each modulation type, and (b) a means for enabling or parameterizing the functional elements.

A functionality of the Universal Tracking Channel 212 is to generate local versions of all Primary and Secondary Codes and Subcarriers of the received signal, as configured by the Host 208, and correlate the demodulated received signal (I, Q) with the local code and subcarrier replicas. After removal (cancellation) of the codes and subcarriers from the received signal, the low bit rate serial navigation message bit stream remains and is conveyed to the host 208. At the same time, the signal is tracked continuously and a global time stamp is recorded at the beginning of each code epoch, for example every 1 ms, to provide range information from each of the signals for further evaluation in the navigation software in the host. The functions to accomplish this task include:

a. latching of global time stamps upon partial code period completion;
   b. latching of internal state counters at fixed 1 ms intervals, both latches being used in managing "epoch skip" in the Global Interrupt Manager 202 and providing synchronized measurements to the host 208; and
   c. transferring the correlation products to the Local Interrupt Module 214 to close the loops (i.e. to compute and propagate loop feedbacks) upon partial code period completion.

The global time signal, 220, is latched upon the local 1ms pulse in the Local Interrupt Manager 310 and sent as a latched time stamp value (TSlatched) over the common interface bus 216, to the Global Interrupt Manager 202.

Every change in the Code Frequency Control signal or the Feedback Component of the Code Frequency Feedback signal 348 (FIG. 3) triggers the ClockReset pulse, see also details of FIG. 8 below.

Figure 4:
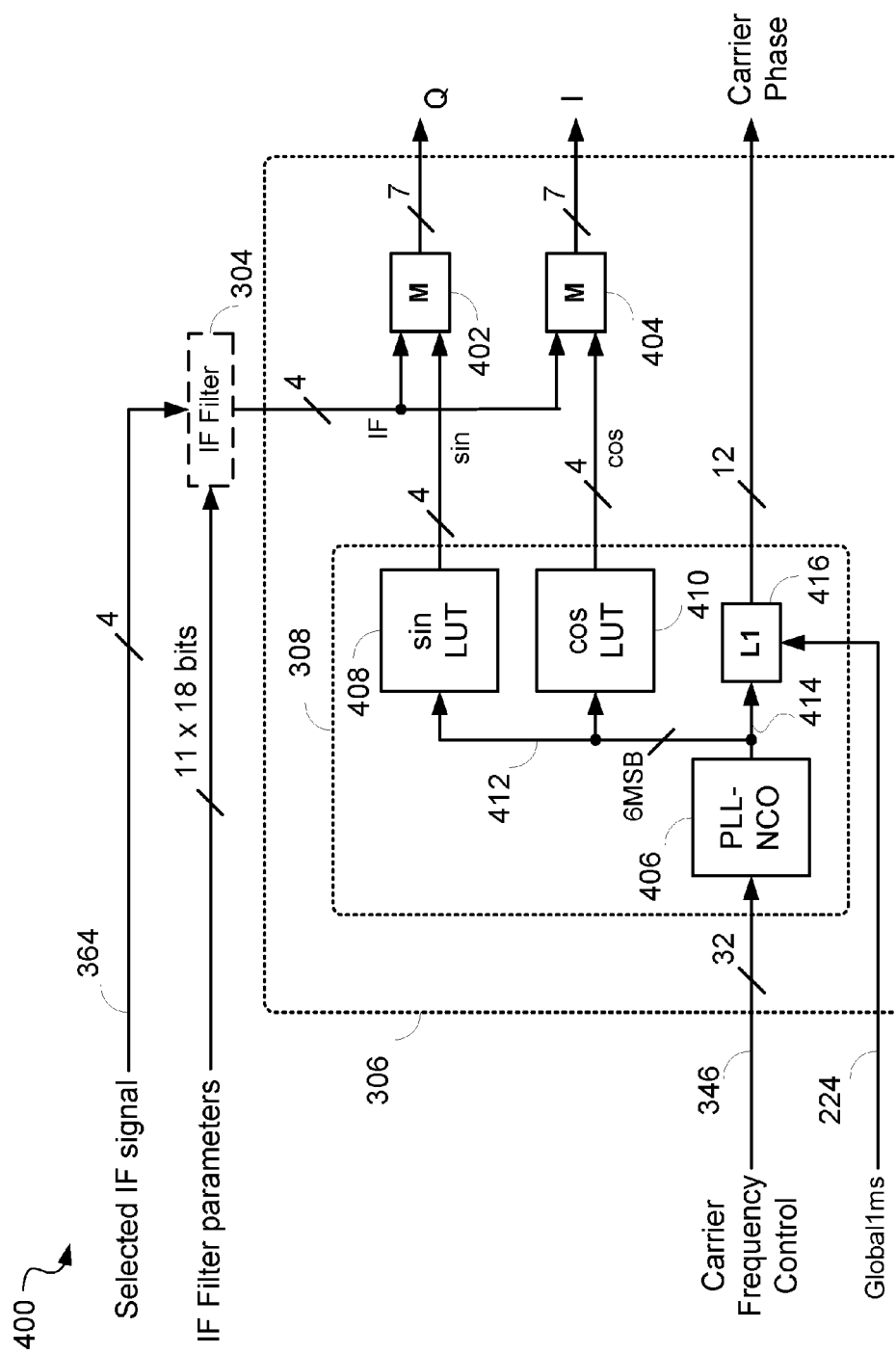
FIG. 4 shows a block diagram 400 of the customizable IF Filter 304 and the Carrier Demodulation Module 306 of FIG. 3.

FIG. 4 shows a block diagram 400 of the customizable IF Filter 304 and the Carrier Demodulation Module 306 of FIG. 3 which comprises the Carrier Generator 308 and two multipliers 402 and 404. The customizable IF Filter 304 is a programmable IIR band-pass filter whose frequency response is set by the IF Filter Parameters control signal received from the Parameter Parsing Module 350. The filtered output of the customizable IF Filter 304 is connected as a 4-bit "IF" signal to an input of each of the Multipliers 402 and 404.

Filtering in the customizable IF Filter 304 could preferably be preserving the number of bits at its input: i.e. 4 bits in the present embodiment of the invention. The number of bits could also be made configurable.

The Carrier Generator 308 includes a Phase Lock Loop—Numerically Controlled Oscillator (PLL-NCO) 406 for generating a local carrier frequency and two look-up tables (LUT), a sin LUT 408 and a cos LUT 410. The PLL-NCO 406 receives the carrier frequency control signal 346 to set its frequency and generates a 12 bit repetitive linear ramp signal at the local carrier frequency. At the same time, the 12 bit repetitive linear ramp signal 414 is available to represent the digital phase of the local carrier, and is latched in a latch "L1" 416 that is clocked by the Globallms signal 224, and output as a Carrier Phase signal. The 6 most significant bits 412 of the Carrier Phase are connected to the LUTs 408 and 410 which convert the linear ramp wave form to output sine (4 bit "sin" signal) and cosine (4 bit "cos" signal) wave forms respectively. The "sin" and "cos" signals drive second inputs of each of the Multipliers 402 and 404 respectively, and the outputs of the Multipliers 402 and 404 generate the "Q" and "I" signals respectively which represent the demodulated carrier, to be also referred to as a baseband signal in this application. The "I" and "Q" signals are each carried in a 7 bit 2-s complement binary signal which covers a numeric range of −56 to +56. Note that the LUTs are purposely encoded to cover only the numeric range of −7 to +7, in order not to cause multiplier overflow in subsequent multiplier stages when multiplying with the 4-bit Selected IF signal 364 which has a range of −8 to +7.

Further details regarding the PLL-NCO may be found in Sauriol, page 110ff. and FIG. 3.33.

Phase Quadrature is explained on page 11 of a GPS document "Naystar GPS Space Segment/User Segment L5 Interfaces" available from http://www.losangeles.af.mil/shared/media/document/AFD-081021-036.pdf: "The two L5 carrier components modulated by the two separate bit trains (I5-code plus data and Q5-code with no data) shall be in phase quadrature (within ±100 milliradians) with the Q5 signal carrier lagging the I5 signal by 90 degrees". In another example, the Galileo E1B&C signal, the data and pilot components are in counter phase (180 degrees difference) and in yet a third example, for the GPS L1C, has the data and pilot components in phase. To take into account such phase relations, the Discriminator Module 354 uses different combinations of the data 332 and pilot 330 correlators. 1) For the phase quadrature scheme, the data component I5 uses standard discriminators based on the data correlator 332 measurements interpreted as I and Q signals while for the pilot component Q5, the pilot correlators 330 are interpreted as Q and −I signals in the discriminator. 2) In the counter phase scheme, the data correlator 332 measurements are interpreted as I and Q signals while the pilot correlator 330 measurements are interpreted as −I and −Q signals in the discriminator. 3) In the In-phase scheme, both data 332 and pilot 330 correlator measurements are interpreted as I and Q signals. This mechanism prevents introducing bias in the measurements.

Figure 5:
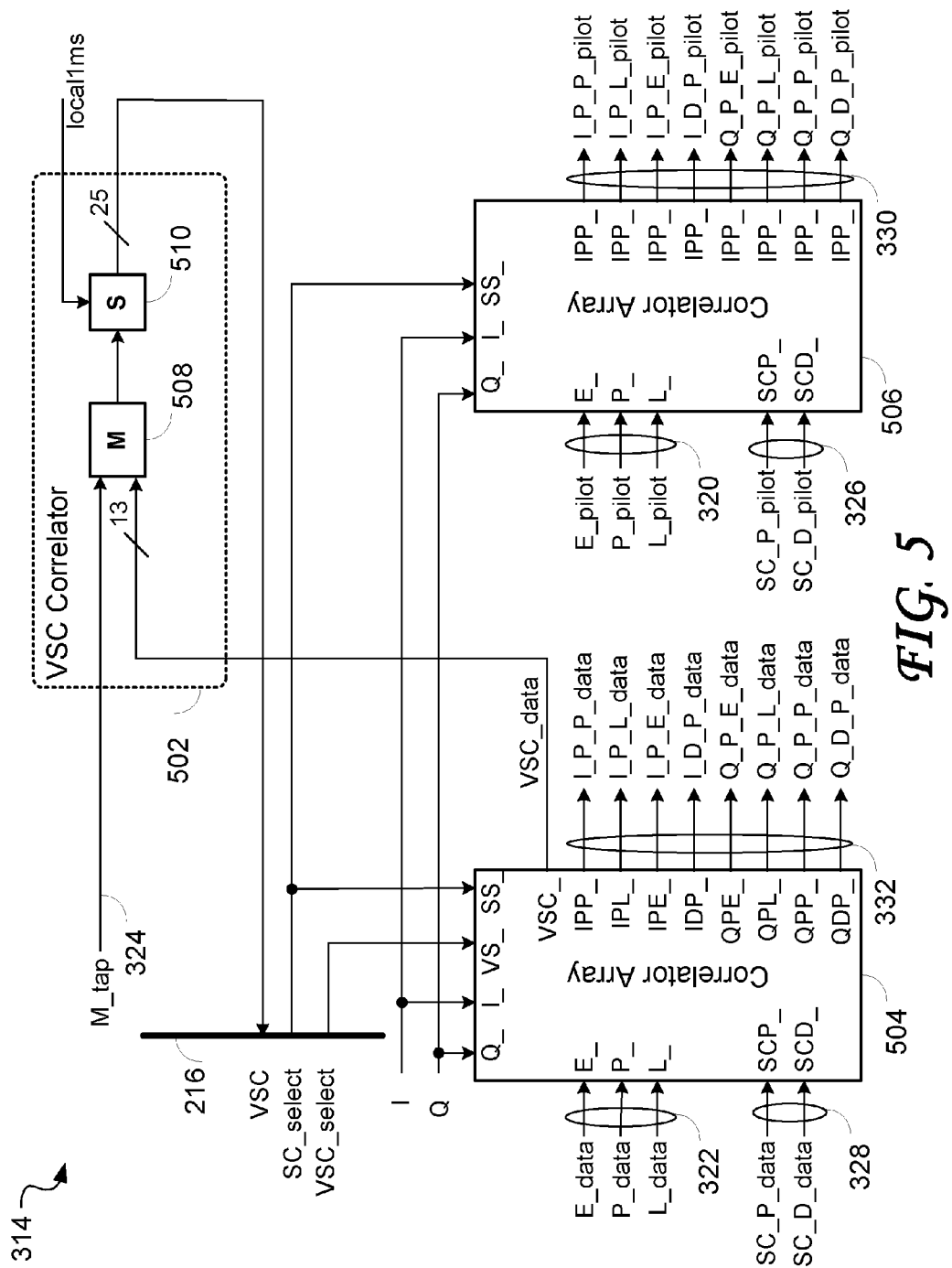
FIG. 5 shows a block diagram of the Correlator Module 314 of FIG. 3, including a compound data Correlator Array 504.

FIG. 5 shows a block diagram of the Correlator Module 314 of FIG. 3, including a VSC Correlator 502 and two compound Correlator Arrays 504 and 506 for data and pilot channel correlations respectively.

The VSC Correlator 502 comprises a multiplier 508 and a summing accumulator (integrator "S") 510. The multiplier 508 receives the variable spacing "M_tap" code 324 from the Code Generation Module 312 and a 13-bit VSC_data signal from the compound Correlator Array 504 to generate a correlation product that is accumulated in the summing accumulator block "S" 510 and output as the VSC signal to the common interface bus 216. The variable spacing "M_tap" code 324 is a single bit signal (logic 1 and 0) which is interpreted in the multiplier 508 as −1 and +1. The summing accumulator block "S" 510 is triggered on the locallms pulse to reset after dumping its accumulated value in an output register.

The compound Correlator Array 504 serves to correlate the demodulated carrier signals ("I" and "Q") with the data spreading codes 322 as well as the combined data sub-carriers 328 to generate the set of the accumulated data correlations 332, under control of a pair of control signals SC_select and VSC_select which are received over the common interface bus 216 from the Parameter Parsing Module 350. The VSC_ data signal is output from a VSC_ output of the data compound Correlator Array 504. The control signal SC_select is only asserted when the currently received GNSS signal includes sub-carriers.

The set of data spreading codes 322 comprises early (E), prompt (P), and late (L) delayed versions of the spreading code, labeled E_data, P_data, and L_data respectively, from the Code Generation Module 312. These are coupled to correspondingly named inputs compound Correlator Array 504, as are the combined data sub-carriers 328 which comprise combined prompt (SC_P_data) and delta (SC_D_data) versions of sub-carriers received from the Subcarrier Combining Module 316. The set of the accumulated data correlations 332 comprises the following eight correlation signals, labelled with three letters signifying the correlated input signals, i.e. a first letter "I" or "Q", a second letter subcarrier "P" or "D", and third letter spreading code "E", "P", or "L", each letter combination followed by "data": I_P_P_ data, I_P_L_ data, I_P_E_ data, I_D_P_ data, Q_P_E_ data, Q_P_L_ data, Q_P_P_ data, and Q_D_P_ data.

Figure 7:
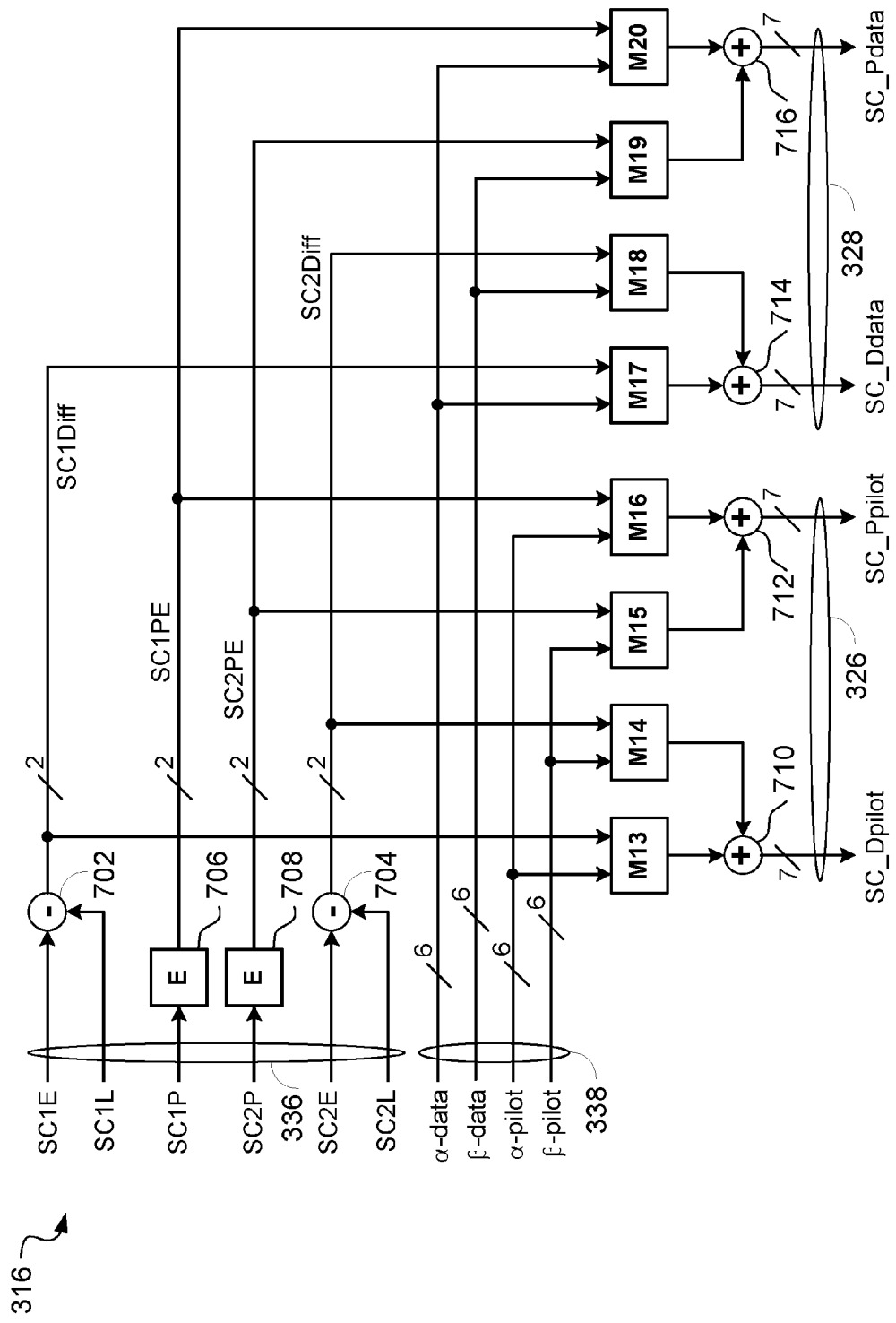
FIG. 7 shows a block diagram of the Subcarrier Combining Module 316 of FIG. 3.
Figure 9:
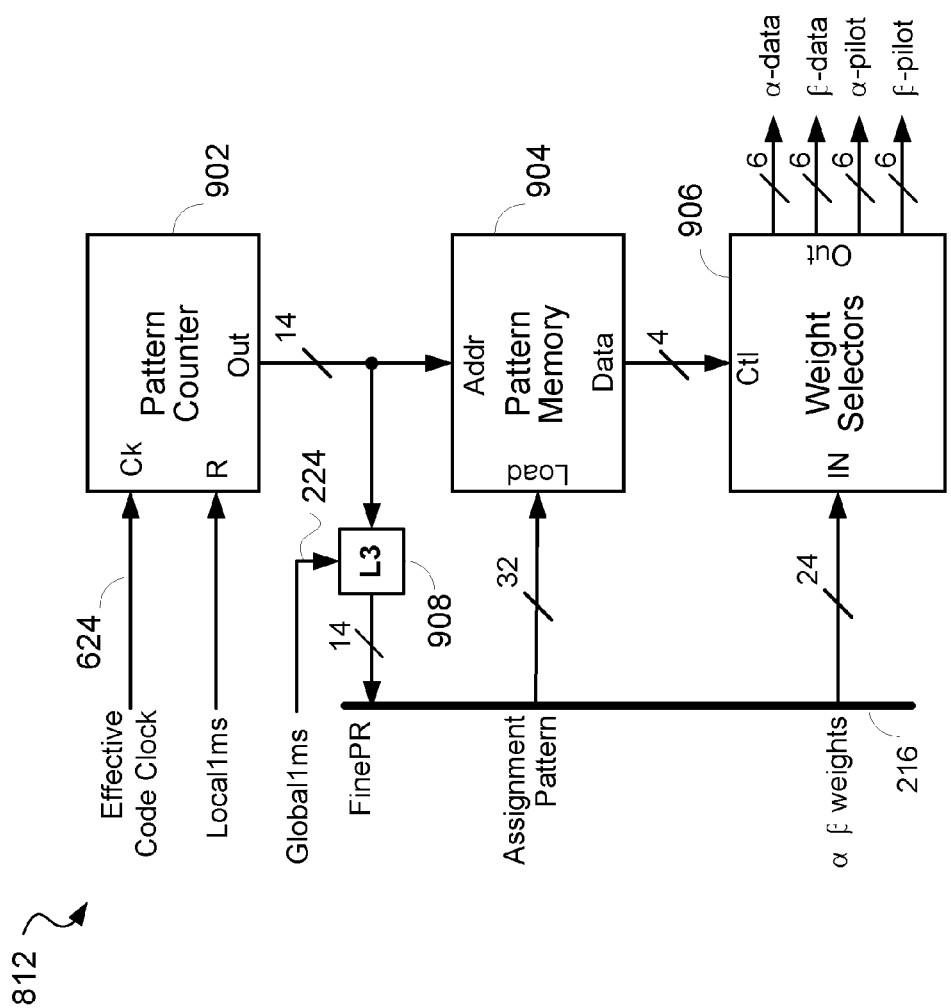
FIG. 9 shows a preferred embodiment of the TMBOC Multiplexer 812 of FIG. 8.

The compound pilot Correlator Array 506 similarly serves to correlate the demodulated carrier signals ("I" and "Q") with the pilot spreading codes 320 as well as the combined pilot sub-carriers 326 to generate the set of the accumulated pilot correlations 330, under control of the input signal SC_select. The input signal VSC_select is not utilized in the compound pilot Correlator Array 506, although it could be populated at the cost of additional resources. When the signal being received does not include a pilot component, the circuit elements of the compound pilot Correlator Array 506 may be bypassed and completely disabled, and their power turned off, in order to conserve power. The same applies generally for circuit elements that are not required depending on signal content, for example sub-carrier generation and combining (FIGS. 7, 8 and 9 below).

Figure 5A:
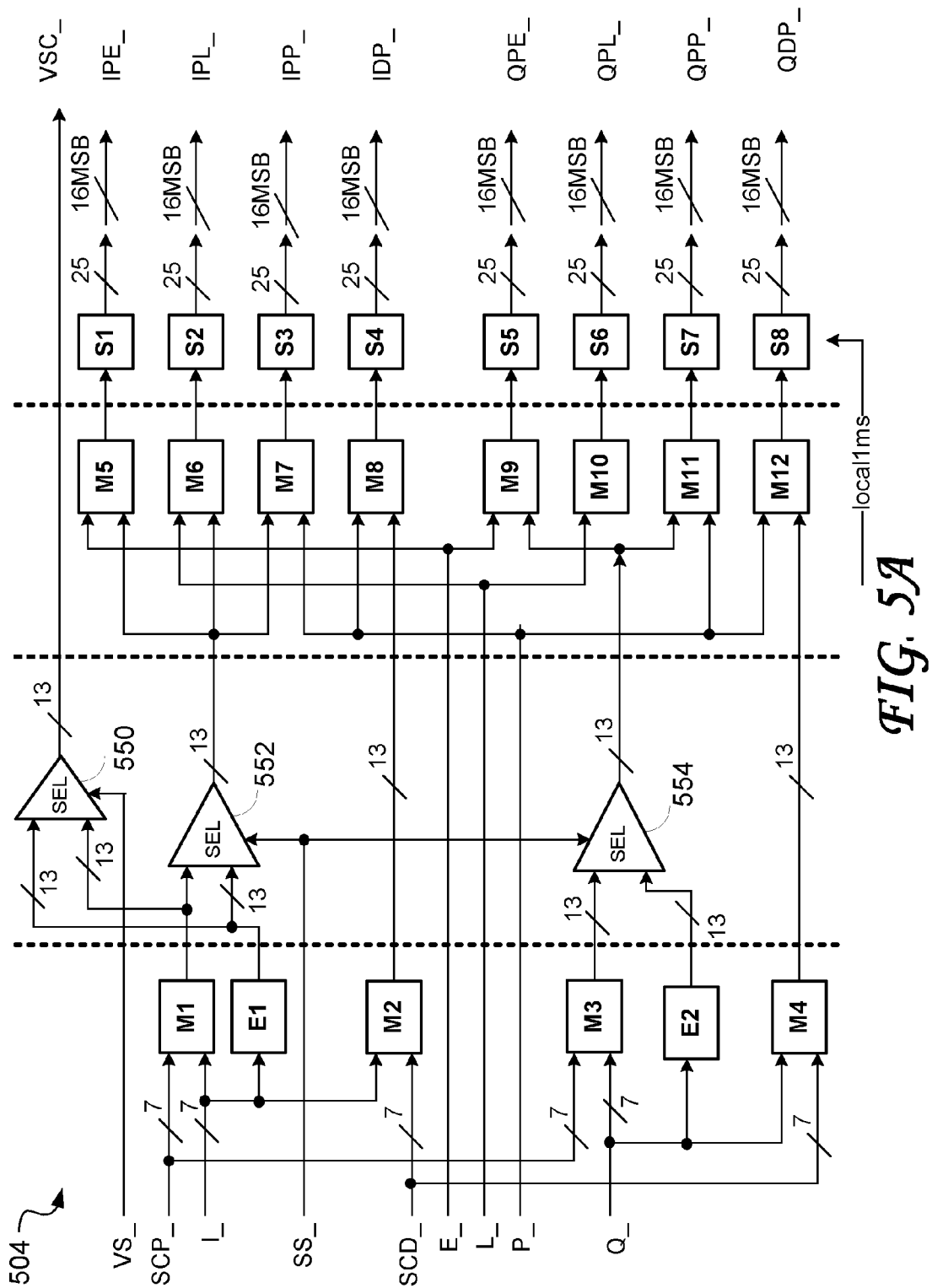
FIG. 5A shows a more detailed block diagram of the compound data Correlator Array 504 of FIG. 5.

FIG. 5A shows a more detailed block diagram of the compound data Correlator Array 504, and equivalently the compound pilot Correlator Array 506, which comprises twelve Multiplier blocks M1 to M12, eight summing accumulator blocks S1 to S8, two expander blocks E1 and E2, and three data selectors 550, 552, and 554. The Correlator Array 504 includes signal input terminals (signals) labelled "I_" and "Q_" for inputting corresponding 7-bit "I" and "Q" signals, "SCP_" and "SCD_" for inputting 7-bit combined subcarrier code signals, "E_", "P_", and "L_" for inputting early, prompt, and late spreading codes which are binary signals, and control input terminals "SS_" and "VS_" for bypassing sub-carrier correlation entirely as described below. The Correlator Array 504 further includes an output labelled "VSC_" for carrying a product of the "I_" signal with the "SCP_" signal or simply the expanded "I_" signal. It also includes a set of 25-bit correlation results of the summing accumulator blocks S1 to S8, of which only the 16 most significant bits (MSB) are forwarded, labelled "IPE_", "IPL_", "IPP_", "IDP_", and "QPE_", "QPL_", "QPP_", "QDP_", the three-letter designations signifying the nature of each correlation.

The block diagram of the compound Correlator Array 504 is divided into four columns of function elements.

The first column comprises the Multipliers M1 and M2 which multiply a 7-bit signal "I_" corresponding to the demodulated carrier signal "I" with 7-bit sub_carrier prompt and delta signals "SCP_" and "SCD_" respectively to generate 13-bit products. It further comprises the Multipliers M3 and M4 which similarly multiply the 7-bit signal "Q_" corresponding to the demodulated carrier signal "Q" with the signals "SCP_" and "SCD_" respectively to generate 13-bit products. It further comprises the expander blocks E1 and E2 whose inputs are connected to the 7-bit signals "I_" and "Q_" and output the received values in a 13-bit format. It is appreciated that the expander blocks E1 and E2 provide the same delay, e.g. by virtue of retiming, as the Multipliers M1 to M4.

The second column comprises the selectors 552 and 554 whose purpose is to allow the Multipliers M1 and M3 to be bypassed when the currently received GNSS signal does not include any subcarriers as indicated by the "SS_" input (connected to the SC_select control signal, see FIG. 5). A "VS_" control signal connected to the selector 550 serves the same purpose to allow the "VSC_" output to be taken from the output of the Multiplier M1, or bypassing it. The "VS_" includes or not the subcarriers on the auto-correlation function obtained by sweeping the received signal with different delays, those providing a signal specific autocorrelation function or a BPSK-like one. No delay is associated with these 3 selectors.

The third column comprises the Multipliers M5 to M7, each multiplying the 13-bit bit output from the selector 552 with one of "E_", "P_", and "L_" respectively. The third column further comprises the Multipliers M9 to M11, each similarly multiplying the 13-bit output from the selector 554 with one of "E_", "P_", and "L_", respectively. The third column further comprises the Multipliers M8 and M12, each multiplying the prompt signal "P_" with the outputs of M2 and M4, respectively.

As mentioned earlier, the multipliers, notably M5 to M12, are equipped to interpret single-bit binary inputs such as "E_", "P_", and "L_" not as one and zero, but as −1 and +1, respectively.

The fourth column comprises the summing accumulator blocks S1 to S8 whose inputs are connected individually to the outputs of the Multipliers M5 to M12. Each summing accumulator block is clocked with the common 60 MHz system clock to accumulate successive 13-bit values from the connected Multiplier for a period of about 1 ms depending on Doppler. The accumulated correlation value is transferred (dumped) to the associated Local Interrupt Module 214 at the end of the locallms period, after which every summing accumulator block is cleared to zero. Then, a new full or partial code sequence can be integrated again. It is estimated that statistically, a 25-bit accumulator range is sufficient for summing the 60,000 signed 13-bit values from the correlator multipliers while minimizing overflowing at a sampling frequency of 60 MHz. To ensure that overflow does not occur, ceiling functions are incorporated in the summing accumulator blocks.

Accumulation in each of the summing accumulator blocks (S 510 in FIGS. 5 and S1 to S8 in FIG. 5A) is performed at 60 MHz with a ceiling function as a safety mechanism to ensure overflow does not occur. Nevertheless, to ensure a linear output range, accumulation is performed over 25 bits, of which the 16 Most Significant Bits (MSB) are transferred to the associated Local Interrupt Module 214 upon the locallms interrupt. The 25 bits are a compromise between design complexity (size) and minimizing the saturation probability considering that a useful signal is corrupted mainly by thermal noise; a detailed justification of these assumptions may be found in B. Sauriol on pp. 118 ff., but with M=13 due to the inclusion of sub-carriers instead of 7 bits in the case of simple BPSK. The summing accumulator blocks S1 to S8 are triggered on the locallms pulse to reset after dumping their accumulated values into respective output registers.

Figure 6:
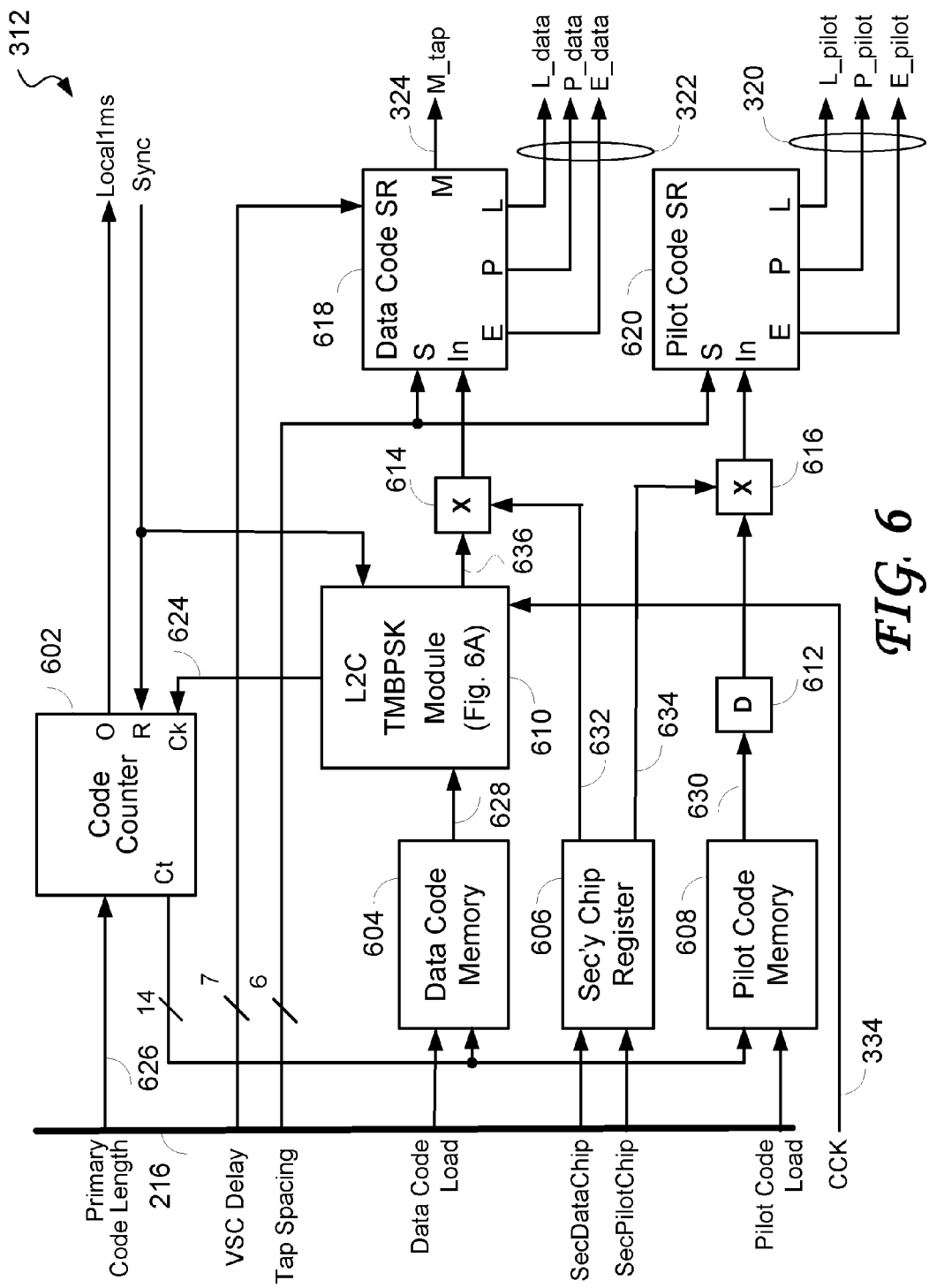
FIG. 6 shows a block diagram of the Code Generation Module 312 of FIG. 3, including a L2C-TMBPSK Module 610.

FIG. 6 shows a block diagram of the Code Generation Module 312 of FIG. 3, comprising a Code Counter 602, a Data Code Memory 604, a Combined Data/Pilot Secondary Chip Register 606, a Pilot Code Memory 608, a L2C-TMBPSK Module 610, a delay stage 612, two XOR gates 614 and 616, a Data Code Shift Register 618, and a Pilot Code Shift Register 620.

The Code Counter 602 is clocked by an Effective Code Clock 624 which is provided by the L2C-TMBPSK Module 610. The Effective Code Clock 624 frequency is equal to the frequency of the code clock (CCK) 334 (see FIG. 3) which is passed through the L2C-TMBPSK Module 610 unchanged, just delayed, except when the modulation type of the received signal is L2C (cf. Table 2). The counting range of the Code Counter 602 is programmed over the common interface bus 216 from the Parameter Parsing Module 350 to equal the Primary Code Length 626, and it may be forced to start from specific point when a given time stamp is reached by the Sync signal which includes an initialization count and a time stamp start from the Local Interrupt Manager 310. This speeds up the acquisition process of the very long L2C code. Every time the Code Counter 602 rolls over, it outputs the local 1 ms pulse which serves to demarcate the Local ~1 ms timing frame (see FIG. 3A). The local 1 ms pulse is delayed by sixty-four (64) clock periods of the 60 MHz system clock from the time the Code Counter 602 rolls over to 0. This delay compensates for the equivalent "prompt" delay (P) due to the delaying of the replica code and sub-carrier signals in the correlators. The Code Counter 602 is a binary counter of preferably 14 bits. The 14 bit count (Ct) is output as the read memory address to both the Data and Pilot Code Memories (604 and 608). The Data and Pilot Code Memories (604 and 608) are loaded over the common interface bus 216 from the Parameter Parsing Module 350 with their respective memory codes (Data Code Load and Pilot Code Load) corresponding to the signal that is to be received. Once loaded, the Data and Pilot Code Memories (604 and 608) output these memory codes as bit streams 628 (primary data memory code) and 630 (primary pilot memory code). In a simple extension of this principle, data and pilot primary codes having different chipping rates (in a case of extended use of potential GNSS signals in the future), the slower primary code is oversampled to match the other one to allow reading both memories with the common Code Counter 602 clocked at the faster chipping rate.

Note, that in the case where code epoch is a multiple of 1 ms, such as the 4 ms code epoch of the Galileo E1B and E1C signals, the local 1 ms pulse is still generated at 1 ms intervals but qualified as a "partial interrupt". Because the Code Counter 602 counts the full epoch (4092 chips in the Galileo case), the locallms is generated by decoding the appropriate counts (1023, 2046, 3069, and 0, details not shown in FIG. 6). When the true code epoch expires, i.e. the Code Counter 602 rolls over to 0, the locallms pulse is then qualified as a "full interrupt", see further details in a section "Longer code epochs" below.

The chips of the secondary codes only change at a 1 ms rate or slower, and the secondary codes are preferably stored in the Local Interrupt Module 214 and sent to Code Generation Module 312 of the Universal Tracking Channel 212 at the 1 ms rate, one chip at a time when the ratio of primary code to secondary chip is 1:1. In the case of GLONASS however where the ratio of primary code to secondary chip is 10:1, the value of each secondary chip is sent repeatedly. The Combined Data/Pilot Secondary Chip Register 606 is a double buffer which receives the a Secondary Data Chip and a Secondary Pilot Chip from the Parameter Parsing Module 350 over the common interface bus 216, and sends Buffered Secondary Data and Pilot Chips 632 and 634 respectively, to first inputs of the XOR gates 614 and 616 respectively, in synchronism with the code epoch.

The primary data memory code 628 is sent into the L2C-TMBPSK Module 610 where it may be multiplexed with a Pseudo Random Noise code. The L2CL modulation type which requires a much greater code length than is practical to be stored in the Data Code Memory 604. The L2C-TMBPSK Module 610 then sends out an effective spreading code 636 that is input to the second input of the XOR gate 614.

The primary pilot memory code 630 is sent through the delay stage 612 to the second input of the XOR gate 616. The purpose of the delay stage is to ensure the pilot code is subject to the same delay as the data code that is propagating through the L2C-TMBPSK Module 610.

The output of the XOR gate 614 is coupled to the input (IN) of the Data Code Shift Register 618, the construction of which is shown in more detail in Sauriol, page 120, FIG. 3.39. Briefly, the Data Code Shift Register 618 is a K-bit shift register (K=128) that is clocked with the 60 MHz system clock and has a fixed tap ("prompt" or P) at the mid point of the register (i.e. Tap=64), and selectable taps at "early" (E) and "late" (L) points, with equal but programmable spacing between P and the E and L points. Spacing is programmed at a "S" input of the Data Code Shift Register 618 with a 6 bit Tap Spacing command sent over the common interface bus 216 by the Parameter Parsing Module 350. The E, P, and L taps are output as E_data, P_data, and L_data of the set of data spreading codes 322. With K=128, and clocking at 60 MHz, the E and L taps of the Data Code Shift Register 618 provide the capability of obtaining copies of the data code shifted in small increments over a range of slightly more than plus or minus one code chip (of a 1023 Mcps chipping rate code), relative to the P tap. The 6 unsigned bit Tap Spacing (Ts) command is interpreted as an unsigned value covering the range of 1 to 64, and defines the delay between the E_data and the P_data signal, and equally between the P_data and the L_data signals in terms of number of system clock periods. The Data Code Shift Register 618 also has 128 taps. The P tap is fixed at the output of stage number 64, the E tap is selecting the output of stage number (63−Ts), and the L tap is selecting the output of stage number (65+Ts).

The Data Code Shift Register 618 has an additional programmable tap, labelled "M", which outputs the variable spacing "M_tap" code 324 that is useful for testing and detailed analysis of the received signal by providing the ability to the host to scan the correlation process at any delay point. The delay of the variable spacing tap is controlled with a 7-bit VSC Delay control signal received from the Parameter Parsing Module 350 over the common interface bus 216 which permits the VSC delay to be arbitrarily set within the entire range of the Data Code Shift Register 618. See an article by M. A. Fortin, J.-C. Guay and R. Jr. Landry, « Real-Time Low-Cost Multipath Mitigation Technique Calibrated through Real Data Repeatable Testing » , Proceedings of the 22nd International Technical Meeting of the Satellite Division of the Institute of Navigation (ION GNSS 2009), pp. 2316-2328, Savannah International Convention Center, Savannah, Ga., 22-25 Sep. 2009.

The Pilot Code Shift Register 620 is similar in construction to the Data Code Shift Register 618 but receives its input from the output of the XOR gate 616, that is the combined Primary and Secondary Pilot Codes. The E, P, and L taps of the Pilot Code Shift Register 620 are output as E_pilot, P_pilot, and L_pilot of the set of pilot spreading codes 320. Unlike the Data Code Shift Register 618, the Pilot Code Shift Register 620 is not equipped with an M_tap, but of course could easily be so equipped if needed for testing and detailed analysis of received pilot codes.

Figure 6A:
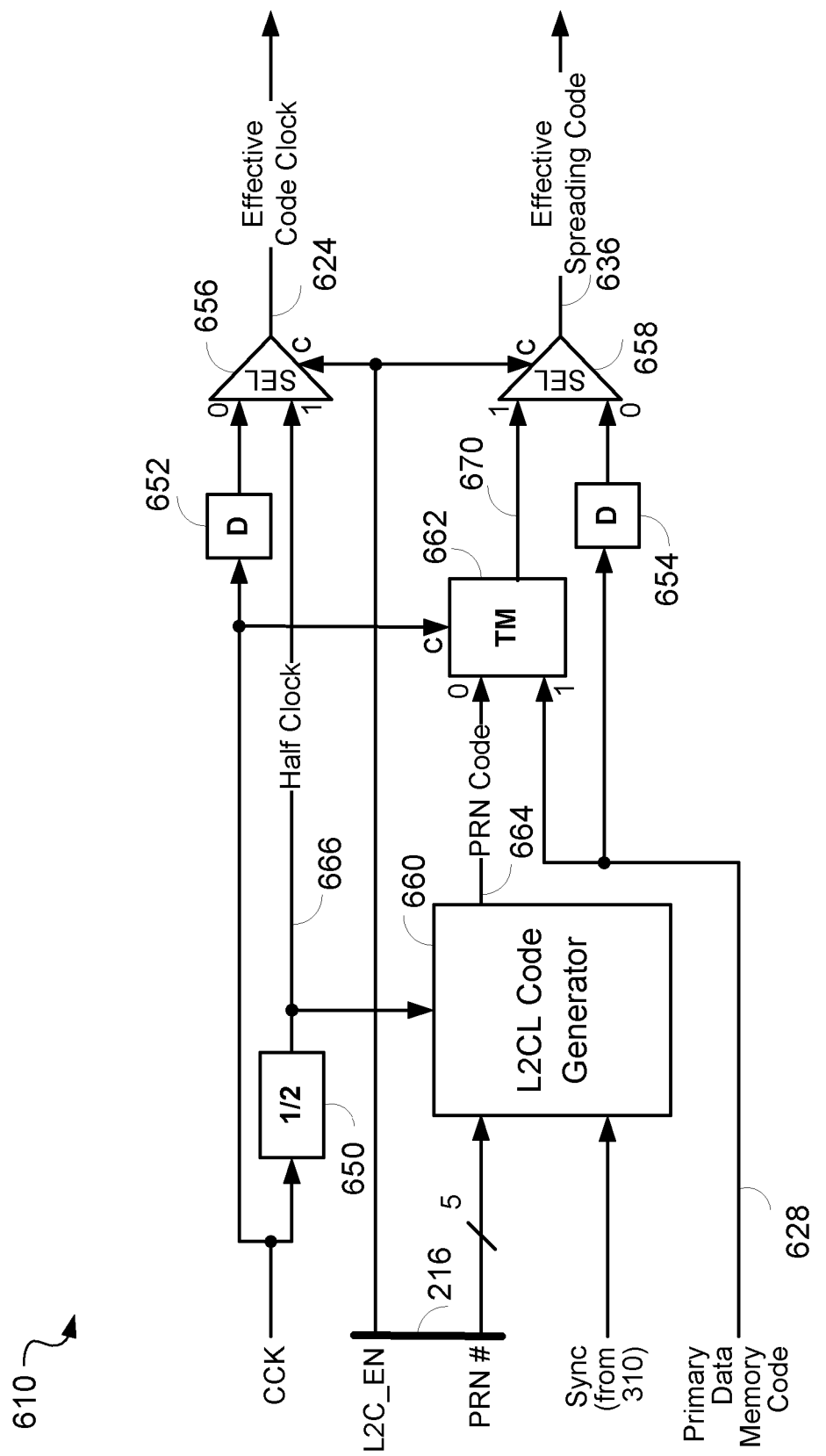
FIG. 6A shows a block diagram of a first embodiment of the L2C-TMBPSK Module 610 of FIG. 6.

FIG. 6A shows a block diagram of a first embodiment of the L2C-TMBPSK Module 610, comprising a Divide-by-2 divider circuit 650, two Delay circuits 652 and 654, two single-bit selectors 656 and 658, an L2CL Code Generator 660, and a time multiplexer (TM) 662.

The code clock (CCK) is coupled to the input of the Divide-by-2 divider 650 and the input of the Delay circuit 652, as well as a control input (c) of the time multiplexer (TM) 662. The primary data memory code 628 is coupled to a signal input (1) of the TM 662 and the input of the Delay circuit 654. An L2C_EN control signal, received from the Parameter Parsing Module 350 over the common interface bus 216, is connected to the control inputs (c) of the single-bit selectors 656 and 658. Inputs of the L2CL Code Generator 660 are connected to receive the Sync signal (which includes the initialization count and the time stamp start) from the Local Interrupt Manager 310 and a five bit PRN # identifier from the Parameter Parsing Module 350 over the common interface bus 216. The output of the L2CL Code Generator 660 sends a "PRN Code" signal 664 to a signal input (0) of the TM 662. The output of the Divide-by-2 divider 650 sends a "Half Clock" signal 666 to a signal input (0) of the single-bit selector 656. The output of the TM 662 sends a multiplexed code 670 to a signal input (1) of the single-bit selector 658. Signal inputs (0) of the single-bit selectors 656 and 658 are connected to outputs of the Delay circuits 652 and 654 respectively, and the outputs of the single-bit selectors 656 and 658 output the effective code clock 624 and the effective spreading code 636, respectively.

The function of the L2C-TMBPSK Module 610 is to pass the code clock (CCK) and the primary data memory code 628 through as the corresponding effective code clock 624 and effective spreading code 636 signals without modification except for the delays imposed by Delay circuits 652 and 654 when the L2C_EN control signal is not asserted.

However, when the received GNSS signal is an L2C signal, the L2C_EN control signal is asserted and the effective spreading code 636 is constructed by multiplexing the primary data memory code 628 with the PRN Code 664 from the L2CL Code Generator 660 at one half the original code clock rate, i.e. at the rate of the Half Clock 666 which is also output as the effective code clock 624.

The L2CL Code Generator 660 is preferably a Pseudo Random Noise Generator (PRNG) in the form of a Linear Feedback Shift Register (LFSR) clocked with the "Half Clock" signal 666, with programmable feed back connections that are selected from a set of 32 available standard configurations by the PRN # identifier.

Because the repetition rate of the PRN code 664 is very long, the Sync signal may be used to jump start the L2CL Code Generator 660 in a "smart acquisition" where data from another satellite can be used by the host 208 to estimate the point in the PRN code sequence of the present signal. The L2CL Code Generator 660 can then be preset to that point using the Sync signal to shorten the acquisition time, and preset the Code Counter 602 to the appropriate corresponding code point.

An alternative way of generating the L2CL signal would be to make use of the (otherwise unused) Pilot Code Memory 608, periodically refreshing its contents with portions of the memory the PRN Code sequence, and then alternate the data and pilot α-weights (FIG. 7) between 0 and 1.

Figure 6B:
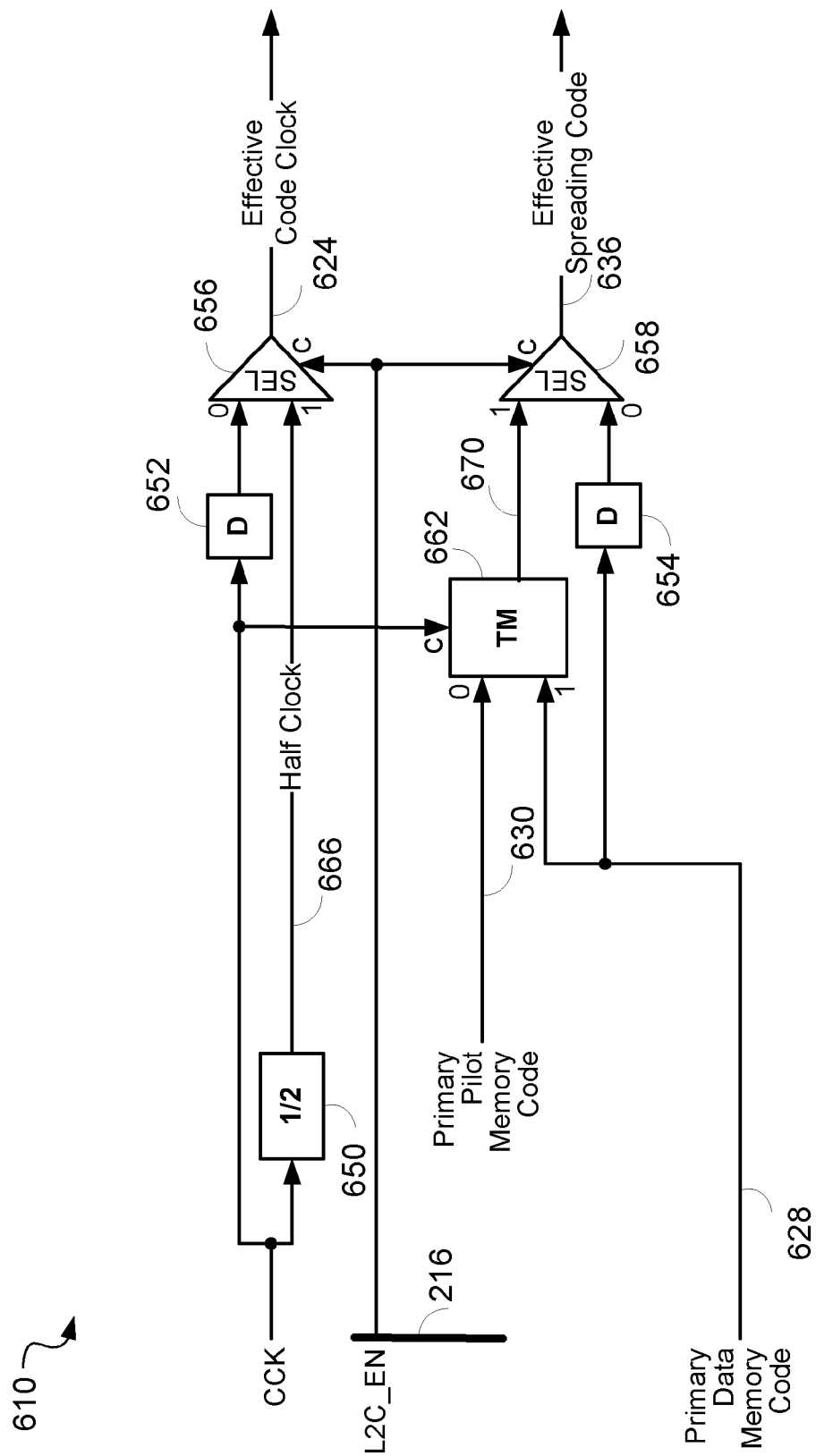
FIG. 6B shows a block diagram of an alternative implementation of the L2C-TMBPSK Module 610 of FIG. 6.

FIG. 6B shows a block diagram of an alternative implementation of the L2C-TMBPSK Module 610 in which the L2CL signal is generated by a portion of the L2CL PRN Code sequence stored in the (otherwise unused) Pilot Code Memory 608 which is periodically refreshed with successive portions of the L2CL PRN Code sequence. This alternative implementation of the L2C-TMBPSK Module 610 differs from the first embodiment only in that the PRN Code of the L2CL Code Generator 660 is replaced by the Primary Pilot Memory Code 630, connected to the input (0) of the multiplexer TM 662.

FIG. 7 shows a block diagram of the Subcarrier Combining Module 316 of FIG. 3, which comprises two subtractors 702 and 704, two Bit Expanders (E) 706 and 708, eight multipliers M13 to M20, and four Adders 710, 712, 714, and 716.

The Subcarrier Combining Module 316 accepts two groups of input signals: the set of subcarrier signals 336 including prompt, early, and late versions of first and second subcarrier signals labelled SC1P, SC1E, and SC1L (first subcarrier SC1), and SC2P, SC2E, and SC2L (second subcarrier SC2); and the set of subcarrier weighting factors 338 labelled α-data and α-pilot for SC1 and β-data and β-pilot for SC2.

The variables α and β refer to weights in the MBOC equations.

The Subcarrier Combining Module 316 generates two groups of output signals: the combined pilot sub-carriers 326 (SC_Dpilot and SC_Ppilot), and the combined data sub-carriers 328 (SC_Ddata and SC_Pdata).

The function of the Bit Expanders 706 and 708 is to accept a one-bit logic signal and expand it to a 2-bit signed signal turning logic 0 into −1 and logic 1 into +1.

Each output signal is generated by combining arithmetic functions as described in the following.

SC_Dpilot is generated by:
  subtracting in the subtractor 702, SC1L from SC1E to generate a 2-bit difference signal SC1Diff;
  subtracting in the subtractor 704, SC2L from SC2E to generate a 2-bit difference signal SC2Diff;
  multiplying α-pilot with SC1Diff in the multiplier M13;
  multiplying β-pilot with SC2Diff in the multiplier M14; and
  adding the outputs of M13 and M14 in the Adder 710 to generate SC_Dpilot.

SC_Ppilot is generated by:
  expanding in the Expander 706 SC1P from one bit to a 2-bit signal SC1PE;
  expanding in the Expander 708 SC2P from one bit to a 2-bit signal SC2PE;
  multiplying α-pilot with SC1PE in the multiplier M16;
  multiplying β-pilot with SC2PE in the multiplier M15; and
  adding the outputs of M15 and M16 in the Adder 712 to generate SC_Ppilot.

Similarly SC_Ddata is generated by:
  multiplying α-data with SC1Diff in the multiplier M17;
  multiplying β-data with SC2Diff in the multiplier M18; and
  adding the outputs of M17 and M18 in the Adder 714 to generate SC_Ddata.

And finally SC_Pdata is generated by:
multiplying α-data with SC1PE in the multiplier M20;
multiplying β-data with SC2PE in the multiplier M19; and
adding the outputs of M19 and M20 in the Adder 716 to generate SC_Pdata.

FIG. 8 shows a block diagram of the Code Frequencies Generation Module 318 of FIG. 3, including a Delay Lock Loop-NCO (DLL-NCO) 802 (also called a numerically controlled code frequency oscillator), a Sub-Carrier Clock Divider (SC-CK Div) 804, a Code Clock Divider (CCK Div) 806, two Sine-Cosine Dividers 808 and 810, a TMBOC Multiplexer 812, a Sub-carrier 2 Shift Register (SC 2 SR) 814 and a Sub-carrier 1 Shift Register (SC 1 SR) 816.

The common interface bus 216 is providing signals for the Code Frequencies Generation Module 318 from the Parameter Parsing Module 350:

to a 47-bit frequency control input "F" of the DLL-NCO 802 with the 32-bit Code Frequency Control signal which is merged with the 32-bit Feedback Component of the 32-bit Code Frequency Feedback signal 348 from the Improved Dual Estimator Module 360 (received via the common interface bus 216) to form a 47-bit signal;

to 4-bit count control inputs (COUNT) of the Sub-Carrier Clock and Code Clock Dividers 804 and 806 with Div-Count-2 and Div-Count-1 signals respectively;

the ClockReset signal connected to reset (R) inputs of the DLL-NCO 802, the Sub-Carrier Clock Divider 804, the Code Clock Divider 806, and the Sine-Cosine Selectors 808 and 810 for initialization;

to phase control inputs (Φ) of the Sine-Cosine Selectors 808 and 810 with the Sub-carrier 1 and Sub-carrier 2 offset control signals (SC1_offset and SC2_offset);

to spacing control inputs (S) of the Sub-carrier 2 and a Sub-carrier 1 Shift Registers 814 and 816 respectively with the Tap Spacing command;

to a Weights (W) input of the TMBOC Multiplexer 812 with a 24-bit word "α, β-weights" carrying the values of the α-data, β-data, α-pilot, and β-pilot weights.

and to the TMBOC Multiplexer 812 with a 32-bit "Assignment Pattern", for sequential downloads of α and β assignment patterns for controlling the assignments of the α and β weights for each primary chip to the α-data, β-data, α-pilot, and β-pilot outputs 338.

It is noted regarding merging the 32-bit Code Frequency Control signal with the Feedback Component of the 32-bit Code Frequency Feedback signal 348 to obtain the 47-bit signal for the frequency control input "F", that the two 32-bit values are appropriately weighted before being summed. Because of the high resolution, more than 32 bits (the bus width of the common interface bus 216) are required, unlike for the PLL-NCO 406.

Not shown in FIG. 8 are registers which receive the signals that are generated by the Parameter Parsing Module 350 and transferred over the common interface bus 216 to the Code Frequencies Generation Module 318. The registers are updated frequently, for example every millisecond, with signal values generated by software programs executing in the Parameter Parsing Module 350. The stored signal values are then available immediately to be continuously read by the hardware of the Code Frequencies Generation Module 318 until they are updated again.

The DLL-NCO 802 is programmed to generate a code super clock 818 of a frequency that is double the desired sub-carrier 2 frequency. The code super clock 818 is coupled to the clock input of the Sub-Carrier Clock Divider (SC-CK Div) 804 which is programmed through the Div-Count-2 signal to generate a intermediate square wave 820 of a frequency that is double the desired sub-carrier 1 frequency. The intermediate square wave 820 is coupled to the clock input of the Code Clock Divider 806 which is programmed through the Div-Count-1 signal to generate the Code Clock (CCK) frequency.

The CCK is thus generated as a result of dividing the output of the DLL-NCO 802 (the code super clock 818) with the two clock dividers, the SC-CK Div 804 and the CCK Div 806.

The square waves 818 and 820 are then each divided in frequency by two with the Sine-Cosine Dividers 808 and 810 respectively to generate first and second raw sub-carrier signals Sub-carrier 2 and Sub-carrier 1 signals 822 and 824, respectively.

Depending on the GNSS signal being received, the second subcarrier may not be required, in which case, the SC-CK Div 804 is effectively disabled (bypassed) by programming the Div-Count-2 signal to a value of 1.

Similarly, if the first subcarrier is also not required, the CCK Div 806 is effectively disabled (bypassed) by programming the Div-Count-1 signal to a value of 1.

The Sine-Cosine Divider 808 may include a flip-flop (FF) that is toggled on the rising or falling clock edge under control of the SC2_offset control signal to generate the in-phase or the quadrature form of the raw sub-carrier 2 signal 822, see FIG. 3A for example sub-carrier waveforms. The Sine-Cosine Divider 810, under control of the SC1_offset control signal, operates analogously to generate the in-phase or the quadrature form of the raw sub-carrier 1 signal 824.

The raw sub-carrier signals 822 and 824 are input to the Sub-carrier 2 and Sub-carrier 1 Shift Registers 814 and 816 respectively which generate prompt, early, and late versions of the first and second subcarrier signals labelled SC1P, SC1E, and SC1L (first subcarrier SC1), and SC2P, SC2E, and SC2L (second subcarrier SC2).

The Sub-carrier 2 and Sub-carrier 1 Shift Registers 814 and 816 are similar in construction to the Data Code Shift Register 618 with fixed taps (P) at the mid point of each register, and selectable E and L points, with programmable spacing between P and the E and L points using the same 6 bit Tap Spacing command as the Pilot and Data Code Shift Registers 618 and 620.

The Code Phase value (see FIG. 3) is an output to the common interface bus 216 via a latch "L2", clocked by the Globallms signal 224, as a 28 bit value, the combination of a 20-bit very fine phase value 826 from a phase output (Φ) of the DLL-NCO 802, another more significant 4-bit very fine phase value 828 from a phase output (Φ) of the SC-CK Div 804, and another even more significant 4-bit very fine phase value 830 from a phase output (Φ) of the CCK Div 806.

The TMBOC Multiplexer 812 receives the "α, β-weights" as a 24-bit signal comprising weighting factors for the sub-carriers from the common interface bus 216, and outputs these weighting factors as individual 6-bit signals in the set of subcarrier weighting factors 338 (α-data, α-pilot, β-data, and β-pilot), multiplexed following α and β assignment patterns as described in the following. The TMBOC Multiplexer 812 alternates α-data with β-data, and α-pilot with β-pilot, multiplexing being timed by the Effective Code Clock 624 which is connected to a clock (CK) input of the TMBOC Multiplexer 812, the assignment patterns being synchronized by the Locallms pulse that is connected to a reset (R) input of the TMBOC Multiplexer 812.

The TMBOC Multiplexer 812 is configured to provide α and β weights according to the GNSS signal modulation format for which this function is currently defined, i.e. BOC (6,1) L1C-Q in GPS, as described in the latest GPS specification update "Draft IS-GPS-800A" which can be found at http://www.losangeles.af.mil/library/factsheets/factsheet.asp?id=9364. This format requires that the frequencies of sub-carriers 1 and 2 are one and six times the code chipping rate (the rate of CCK), and a pattern covering 33 chips is created in which subcarrier 2 is alternated with subcarrier 1 in a [0, 4, 6, and 29] pattern that repeats every 33 chips, see FIG. 3.3-2 of the IS-GPS-800A Draft.

According to the preferred embodiment of the invention, the TMBOC Multiplexer 812 is fully programmable to implement any given time multiplexing scheme between 2 sub-carriers, for example the MBOC modulation scheme that is proposed for the GPS L1C's pilot component described above (as opposed to the CBOC scheme of Galileo E1B&C and the yet to be defined COMPASS B1 signals). In the GPS L1C's pilot component of the signal, the sub-carrier 2 (a 6×1.023 MHz square wave) alternates with the sub-carrier 1 (a 1×1.023 MHz square wave) in a repeating pilot assignment pattern of four code time slots [0, 4, 6, and 29] out of 33 time slots. Replicating this format is accomplished in the TMBOC Multiplexer 812 by allocating the full amplitude to the β-weight in these four time slots while at the same time zeroing the α-weight. This weight inversion implies true time-multiplexing of the 2 sub-carriers as they are weighted and combined as depicted in FIG. 7.

FIG. 9 shows a preferred embodiment of the TMBOC Multiplexer 812, including a pattern counter 902, a weight assignment pattern memory (pattern memory) 904, and a Weight Selectors logic circuit 906.

The assignment pattern is stored (from the common interface bus 216) in the pattern memory 904 of 4-bit by 16K capacity. A read address input of the pattern memory 904 is connected to the output of the pattern counter 902 which is a 14-bit counter similar to the Code Counter 602 (see FIG. 6), and is programmed to count to the primary code length, and clocked by the effective code clock 624. In the case of GPS L1C pilot for example, the 33 chip pattern is repeated over the primary code length of 10230. A 4-bit pattern output is read out from the pattern memory 904 and connected to a control input of the Weight Selectors logic circuit 906 which forwards the α- and β-weights inputs selectively to each of the α-data, α-pilot, β-data, and β-pilot outputs of the TMBOC Multiplexer 812, in the time slots defined by the pattern. To compensate for the equivalent "prompt" delay (P) of 64 periods of the 60 MHz system clock, the pattern output is also delayed by 64 periods. In this preferred embodiment, the pattern counter 902 runs in parallel with the Code Counter 602, but its output is effectively delayed by 64 system clock periods because it is synchronized (Reset to 0) with the Local1ms pulse which is already delayed by 64 system clock periods. In an alternative embodiment (not shown), this delay is introduced for example with a 14-bit wide 64-stage shift register to delay 14-bit count output from the Code Counter 602, in place of the pattern counter 902.

The 14-bit count (Out) of the Pattern Counter 902 at the time of the fixed 1 ms global interrupt, is latched in a latch "L3" (908) with the global interrupt pulse 224 which outputs the latched value as a Fine Pseudo Range (FinePR) signal over the common interface bus 216 to the Global Interrupt Manager 202.

The latched FinePR signal, the latched CodePhase signal, the latched CarrierPhase signal, along with the latched time stamp TSlatched, are polled by the Global Interrupt Manager 202 upon the 1 ms global interrupt and sent to the Host 208. This will allow the host software to reconstruct the precise transmission delay time of the primary code start for each Universal Tracking Channel 212.

Taking into account that the weight assignment pattern is configurable, the TMBOC Mux 812 thus contributes in making the proposed acquisition/tracking channel design universal and future-compliant. The design could easily be extended to account for more sub-carriers through more initial weights and additional weight assignment memories, if a new signal type eventually should require such a feature. Thus, only minor changes are required to maintain the Universal Tracking Channel 212 up to date with new GNSS signals.

Applicability to Modulation Types

Considering all the civil signals of the four systems presented in Table 2 (with E5a and E5b taken separately to relax the constraint on the minimum sampling frequency imposed by the Nyquist-Shannon Theorem), a number of outstanding signal characteristics have to be accommodated by the Channel Processor 204:

BOC Tracking Ambiguity;
L2C code generation and time multiplexing in GPS;
FDMA in GLONASS;
a data-free pilot signal component requiring double the number of correlators; and
modernized L1 signals with MBOC modulation that requires multi-bit encoding of different combinations of two square sub-carriers.

Instead of implementing dedicated channels for each type of GNSS signal, which may not be used 100% of the time, a universal approach is proposed. This has the advantages of increasing robustness as on-the-fly signal re-assignment by reconfiguring universal channels avoids idle dedicated channels. It also makes it more difficult to entirely jam satellite signals because all signals on all bands would need to be jammed. Not to mention the fact that there is a really good possibility that the GNSS satellites are re-configured by the system operators to restrict or prevent enemies from using their signals, while this system is able to be reconfigured to have continued use on other available signals. Also, military receiver manufacturers would not need to be aware of the encrypted codes as these could later be updated by the regulated, military or commercial users themselves. In fact, those codes could seamlessly be changed as frequently as desired without the need to develop and maintain secrecy agreements.

Longer Code Epochs

Where the nominal specified code epoch is longer than 1 ms, it is still always a multiple of 1 ms, for example 4 ms in the Galileo E1B and E1C signals, 20 ms for L2CM and 1.5 s for L2CL. In such cases "full interrupts" are differentiated from "partial interrupts", where a "full interrupt" is defined at the end of the code epoch. Correlations are always accumulated and "dumped" to the interrupt handler Local Interrupt Module 214 for processing at the 1 ms rate, whereas feedback signals (the carrier frequency control signal 346 for the Carrier Demodulation Module 306, and the Code Frequency Feedback signal 348 for the Code Frequencies Generation Module 318) are updated at the end of the specified total coherent and non-coherent integration periods. Between two feedbacks, the Universal Tracking Channel 212 continues in applying the previously computed feedbacks. For the signal types where the code epoch is 1 ms long, all 1 ms interrupts are "full interrupts". Operations that require a full code epoch to have been received, are performed only after a "full interrupt" occurs, for example setting the secondary code chip register 606, restarting the code counter 602, and restarting the pattern counter 902 of the TMBOC Mux 812.

BOC Tracking Ambiguity

The possibility of tracking false peaks arises when a squared Auto-Correlation Function (ACF) is used in acquiring and tracking a BOC signal. In the simplest case of BOC (1,1), there are 2 side peaks, whose tracking would induce a Pseudo-Range (PR) error of ~150 m.

BOC's ACF is known to have side peaks causing ambiguous tracking, as for example described by J. W. Betz in "Binary Offset Carrier Modulations for Radionavigation," in Journal of The Institute of Navigation. vol. 48, 2001, pp. 227-246. A number of BOC tracking architectures have been proposed in the past. Of these, the Dual Estimator (DE) of M. S. Hodgart, et al. "The optimal dual estimate solution for robust tracking of Binary Offset Carrier (BOC) modulation," Fort Worth, Tex., United States: Institute of Navigation, Fairfax, Va. 22030, United States, 2007, pp. 1017-1027, appeared suitable for implementation in the present invention since this approach seems robust, flexible and simple, and was therefore modified and adapted in the Improved Dual Estimator Module 360. In fact, the improved version combines two or more sub-carriers' common filtered feedback with the code filtered feedback, in the same way than the original dual estimator. Each feedback is accompanied by a reset signal intended for the Code Frequencies Generation Module's 318 building blocks. The resulting Code Frequency Feedback signal 348 is then equally applied for both data and pilot components of a complex signal. This is a great simplification compared to the dual estimator's inventors proposal for MBOC signal, i.e. the triple estimator as presented in: M. S. Hodgart, R. M. Weiller, and M. Unwin, "A Triple Estimating Receiver of Multiplexed Binary Offset Carrier (MBOC) Modulated Signals," in Proceedings of the 21st International Technical Meeting of the Satellite Division of the Institute of Navigation ION GNSS 2008 Savannah, pp. 877-886, Georgia Institute of Navigation, Fairfax, Va. 22030, United States, 2008.

L2CL Code Generation and Time-Multiplexing

Since most spreading codes have been released as memory codes, the logical approach of the universal channel meant implementation of all codes as memory codes. This has the advantage of using the same resources for all channels instead of implementing 21 or more PRN based code generators per channel. The only exception to this rule is the Code Long (CL) spreading code which is time-multiplexed with the Code Moderate (CM) in GPS L2C, see Table 2. The length of CL is 767,250-chip would impose a high upper bound on the size of the code memory dedicated to each channel if CL were also implemented as a memory code. A realistic memory block size is, for example, 16 kbit, which is a standard size for the Virtex4 device, on which the first implementation of the invention is based. The Data and Pilot Code Memories 604 and 608 have the capacity of storing all spreading codes except CL, including codes of length 10,230 which corresponds to the second longest code, found with the L5, E5 and B3 signals. Hence, the decision was made to include two 16 kbit RAMs, which account for the data and pilot codes of each signal type except for the CL spreading code for which a dedicated module, the L2C-TMBPSK Module 610 is provided.

To account for the secondary code, whose length span from four to 1800 chips, the memory code approach could also have been adopted. In fact, the same two RAMs used in the Data and Pilot Code Memories 604 and 608 would have the extra capacity to store the secondary codes. However, the preferred embodiment is shown in FIG. 6. Because the chip length of the secondary codes is one millisecond or longer, it is simpler to allow the Local Interrupt Module 214 to read this code in real time from an on-board memory (e.g. in dedicated memory segments of the above mentioned SDRAM on the development board which serves as the processor interface bus 206), and supply one secondary data chip and one secondary pilot chip, to be double buffered by the Combined Data/Pilot Secondary Chip Register 606. The buffered secondary chips are then XOR-d with the primary codes in the XOR gates 614 and 616.

GLONASS FDMA

As described in the GLONASS ICD, the frequency plan of this signal type includes 14 adjacent frequency slots in each band, separated by 0.5625 MHz (L1 band) or 0.4605 MHz (L2 band). After down-conversion to the Intermediate Frequency of 15 MHz, for example, the resulting signal requires a Frequency or Phase Lock Loop (FLL/PLL) which can track a frequency range from 15.0−6*0.5625=11.625 MHz to 15.0+7*0.5625=18.9375 MHz. This represents a large increase compared to the traditional range of only ±10 kHz required for Doppler removal. It is appreciated that the 15 MHz center frequency of the IF, sampled at 60 MHz deals effectively with all signals within a double-sided main-lobe bandwidth lower than 30 MHz, as prescribed by the Nyquist-Shannon theorem.

A specific GLONASS signal is acquired by setting the carrier frequency control signal 346 to the expected center frequency and then allow the PLL-NCO 406 to track any Doppler (small) frequency deviations.

In addition, the optional customizable IF Filter 304 is used to optionally filter out any adjacent GLONASS FDMA frequencies.

Dual Component Channel

Regarding the civil signals that have two components added in counter phase I or in quadrature Q (such as Galileo E1B&C described in the Galileo OS SIS ICD Draft 1, "Galileo Open Service Signal In Space Interface Control Document, Draft 1," European Space Agency/European GNSS Supervisory Authority 2008, and in the ARINC document "Naystar GPS Space Segment/User Segment L5 Interfaces," Naystar GPS Joint Program Office, El Segundo, Calif. 2005), a design choice had to be made. Either each component is dealt with in a separate channel, whose correlators are properly dealt with through a common discriminator, or both components are integrated into a single universal channel.

The preferred embodiment of the invention is based on integrating both components into the single universal channel because this choice allows for hardware efficiencies as follows:

common address and control logic for memory codes, even in the case of different chipping rates on data and pilot;

shared components for frequency generation of Code (DLL NCO) and Sub-Carriers, and of prompt P and differential D=E−L shared by both signal components, assuming same sub-carriers on data and pilot, which is the case currently;

common PLL NCO, sine and cosine Look-Up Tables and multipliers leading to the I and Q branches;

a 27-stage Linear Feedback Shift Register (LFSR) for generating the L2CL code needs to be implemented only once per dual component channel;

common variable E and L spacing shift registers; and the Variable-Spacing Correlator (VSC) feature described in "Real-time Multipath Monitoring and Characterization with a variable Spacing Correlator on a FPGA-Based Software GNSS Receiver" by J.-C. Guay, B. Sauriol, and M.-A. Fortin, published in Proceedings of the Institute of Navigation—ION GNSS 2008, pp. 2316-2328, Fort Worth, Tex., United States: Institute of Navigation, Fairfax, Va. 22030, United States, 2008, needs to be implemented only on the data component of the dual component channel.

In addition, faster sequential acquisition is possible with the dual component architecture: dual code delay search makes acquisition two times faster. In order to minimize consumed power, the pilot component hardware may be idled during BPSK tracking.

Also note that to maximize received signal power (as the total signal's power may be divided among the data and pilots components), the pilot correlators are the same as those on the channel's data component, i.e. Early (E), Prompt (P) and Late (L) on both I and Q branches, as seen in FIGS. 5 and 5A. Moreover, all these signals allow for any discriminator to be used: e.g. $I_x$ and $Q_x$ correlators are used for an In-phase pilot while $Q_x$ and $-I_x$ correlators would be used for a quadrature pilot. This means, basically any coherent and/or non-coherent discriminators could be used depending on the signal's characteristics and on the receiver's environment. All these characteristics can be optimized in real-time according to the environment.

Full MBOC Support

Since new GPS, Galileo and COMPASS L1/E1 signals produce the same MBOC spectrum, but in a different manner, they are supported by the embodiments of the invention through amplitude-, phase- and frequency-configurable square sub-carriers. This architecture would equally be valid for any sine or cosine BOC(p,q) modulation variations, with a sub-carrier factor p and a chipping rate factor q, both multiplying the 1.023 MHz reference frequency.

As seen in FIG. 7 above, both the SC2 and SC1 sub-carriers, with p=6 and p=1 in the case of MBOC, are combined into four multi-bit signals prior to the correlation process (FIG. 5A) to reduce the number of correlators, while preserving the matched filter approach: i.e. reproducing the incoming signal as reliably as possible in the local replicate signal. In addition, for the discrimination of the subcarriers, only a differential D=E−L correlator is used on the prompt code of both I and Q branches, as opposed to the initial Triple Estimator (TE) proposal of M. S. Hodgart, at al. in "A Triple Estimating Receiver of Multiplexed Binary Offset Carrier (MBOC) Modulated Signals," in Proceedings of the 21st International Technical Meeting of the Satellite Division of the Institute of Navigation ION GNSS 2008, pp. 877-886, Savannah, Ga. Institute of Navigation, Fairfax, Va. 22030, United States, 2008. In order to address both MBOC implementations described by equations (2) to (5) above, the weighing factors α for SC1 and β for SC2 must be selected from the sets of [1, 0.95, 0] for α and [1 +0.30, −0.30, 0] for β. The factors α and β can be represented digitally with sufficient resolution as 6 bit signed values. Time-multiplexing is managed by interruptions. In fact, the amplitude ratio of 0.95 (sqrt(10/11)) versus 0.30 (sqrt(1/11)) gives 3.166666. An equivalent ratio is obtained through integer values 19 versus 6, which can be represented using 6-bit signed values.

A simple signed multiplication optimization is preferably used were this is applicable, for example, in the multipliers 402 and 404 of FIG. 4: Y bits x Z bits =(Y+Z−1) bits which is true only if the minimal twos complement value is never used on both operands simultaneously, e.g. 1111×1111 is not permitted in 4-bit multiplications. This general rule also applies for sub-carrier multiplications with α and β weights required by MBOC (multipliers M13 to M20 in FIG. 7), as well as for multipliers M1 to M4 in FIG. 5A. Note that in the case of BPSK tracking, the sub-carrier multiplications are simply disabled and bypassed. Nevertheless, the sub-carrier multiplications require that the summing accumulator blocks ("S" 510 in FIG. 5 and S1 to S8 in FIG. 5A) are computed over a sufficient number of bits (increased from 18 to 25).

The maximum likelihood architecture of the invention for tracking a spread spectrum signal is a matched filter, that is, a traditional correlator as described by J. W. Betz in "Binary Offset Carrier Modulations for Radionavigation," in Journal of The Institute of Navigation. vol. 48, 2001, pp. 227-246. Accordingly, the Early (E), Prompt (P) and Late (L) Delay Lock Loop (DLL) discriminator approach is used for the spreading code on both I and Q branches, but only with the prompt (P) replicate of the sub-carriers as shown in FIG. 5A. From that figure, one can appreciate the six traditional correlators and integrators resulting in IPE_, IPL_, IPP_, QPE_, QPL_ and QPP_ (FIG. 5A) as well as the extra resources required for the dual channel (i.e. the pilot Correlator Array 506 in addition to the traditional data Correlator Array 504 in FIG. 5 as well as pilot related resources in FIG. 6) and for the MBOC (the IDP_ and QDP_ correlation outputs obtained with the additional clock dividers 804 and 806, the shift registers 814 and 816, and the TMBOC MUX 812 of FIG. 8 and the Sub-carrier combining module 316, details in FIG. 7) architectures. Note that the L2C-TMBPSK Module 610 used in generating a very long spreading code (i.e. L2CL) has no impact at the correlator level in the preferred embodiment. Also note that all the above additional resources representing signals' particularities may become idle in the tracking channel, depending on the signal's characteristics. The Variable Spacing Correlator (VSC) 502 in FIG. 5 and the use of the M_tap signal 324 from the Data Code Shift Register 618 is not mandatory for signal tracking; it is useful in computing the Auto-Correlation Function (ACF) as well as for a multipath mitigation technique that is proposed by M. A. Fortin, J.-C. Guay and R. Jr. Landry, « Real-Time Low-Cost Multipath Mitigation Technique Calibrated through Real Data Repeatable Testing » , Proceedings of the 22nd International Technical Meeting of the Satellite Division of the Institute of Navigation (ION GNSS 2009), pp. 2316-2328, Savannah International Convention Center, Savannah, Ga., 22-25 Sep. 2009.

The described optimizations result in reducing the number of correlators to 2×8=16 (apart from the optional VSC) per universal channel, as depicted in FIGS. 5 and 5A. This represents a small increase compared to the traditional 2×6 (identified above)=12 correlators per dual Binary PSK (BPSK) tracking channel. Note that if a differential D=E−L code simplification were also used, the resulting number of correlators could be even further reduced to 2×6 correlators for a dual component non-coherent phase solution or down to 2×3+1=7 correlators coherent phase version. Hence, the sub-carriers combination further simplifies the Triple Estimator architecture (whose single component coherent proposal presents 5+1=6 correlators). Note that combining the sub-carriers also simplifies the discriminator, which then becomes similar to the Dual Estimator, with the same or better performance as those described by M. S. Hodgart, P. D. Blunt, and M. Unwin in "The optimal dual estimate solution for robust tracking of Binary Offset Carrier (BOC) modulation,": Institute of Navigation, Fairfax, Va. 22030, United States, 2007, pp. 1017-1027.

Furthermore, a customizable delay (through proper reset of a rising/falling edges counter of a signal at twice the targeted frequency) is introduced at the outputs of the SC2 and SC1 generators 808 and 810 respectively (FIG. 8) in order to achieve sine-BOC as well as cosine-BOC, i.e. the sub-carrier may be in phase with the code or in quadrature, as is the case for the Galileo commercial signal E1A, specified in the previously mentioned Galileo OS SIS ICD Draft 1. Finally, the resulting universal GNSS channel architecture, combining all the above described particularities (i.e. L2C, FDMA, dual component and MBOC) has been detailed.

Results and Discussion

An important aspect of the invention concerns the characteristics that are important to consider and their associated resources. Table 3 details the implementation resources estimated for each of the individual characteristics previously identified, as well as those required for the universal GNSS tracking channel according to embodiments of the invention. The FDMA support comes at no extra cost since the additional frequency range introduced by GLONASS' current signals is covered in the PLL-NCO 406. Implementation of the L2CL code generation (see FIG. 6A) and time-multiplexing costs half a traditional channel and provides a 3 dB tracking sensitivity gain as well as a 3 dB accuracy gain. The dual channel design only costs half a BPSK channel due to the previously identified resources sharing. Finally, the cost of sub-carrier combination, the added multiplications, and the increased integrators, is equivalent to another half traditional channel for each (data and pilot) component. The universal channel according to the preferred embodiment of the invention, which combines all these functions ends up using 142% more resources than a traditional GPS L1 C/A tracking channel, but gains the flexibility of tracking any known GNSS civil signal. Note that this initial representative estimation could benefit from further design optimization.

Furthermore, the current FPGA implementation design has a low worst-case of 48 mW/channel power consumption (including all board level interfaces), as estimated by the Xilinx ISE XPower software. This corresponds to only a 60% increase compared to the traditional BPSK channel. Based on an article by I. Kuon and J. Rose, "Measuring the gap between FPGAs and ASICs," IEEE Transactions on Computer-Aided Design of Integrated Circuits and Systems, vol. 26, pp. 203-215, 2007, a Field Programmable Gate Array (FPGA), such as the one used in the current implementation may consume as much as 12 times as much power as an Application Specific Integrated Circuit (ASIC) of a comparable size. Thus, a 4 mW/channel power consumption may be a more representative for an ASIC implementation. This value compares favorably with the power consumption of a commercially available GPS module, for example the 1-bit GPS L1 C/A receiver from u-blox corporation (u-blox 5 Single Chip GPS receiver UBX-G5010) which is specified to be <1.3 mW/channel. Assuming that the same percentage increase (142%) would be applied to account for the power consumption of all features of the universal channel according to the preferred embodiment of the invention, a 3.15 mW/channel could be expected when implemented in an ASIC. It is noted that this u-blox power extrapolation does not include all Universal Channel features, such as VSC and 4-bit input quantization of the IF.

The total memory requirement for storing all memory codes of 614 civil signal components is 1228 kB. This of course excludes the L2CL code which is generated with an LFSR in the L2CL Code Generator 660.

Table 3 shows a device utilization summary for various GNSS channel designs based on a Virtex 4 XC4VSX55 FPGA from Xilinx corporation evaluation.

TABLE 3

Device Utilization Summary

| Virtex4 VSX55 Logic Utilization | Available | GPS L1 C/A | GPS L2C | | GPS L5 | | Galileo E1B | | Universal | |
|---|---|---|---|---|---|---|---|---|---|---|
| Number of Slice Flip Flops | 49,152 | 895 | 1,068 | 19% | 1,179 | 32% | 1,125 | 26% | 1,652 | 85% |
| Number of 4 input LUTs | 49,152 | 1,034 | 1,161 | 12% | 1,463 | 41% | 1,330 | 29% | 1,910 | 85% |
| Number of occupied Slices | 24,576 | 858 | 1,019 | 19% | 1,163 | 36% | 1,083 | 26% | 1,625 | 89% |
| Total Number 4 input LUTs | 49,152 | 1,118 | 1,265 | 13% | 1,596 | 43% | 1,397 | 25% | 2,175 | 95% |
| Number of BUFG/BUFGCTRLs | 32 | 1 | 1 | 0% | 1 | 0% | 1 | 0% | 1 | 0% |
| Number of FIFO16/RAMB16s | 320 | 2 | 3 | 50% | 3 | 50% | 3 | 50% | 5 | 150% |
| Number of DSP48s | 512 | 3 | 3 | 0% | 3 | 0% | 7 | 133% | 11 | 267% |
| Total equivalent gate count for design | | 148,381 | 216,174 | 46% | 220,212 | 48% | 218,538 | 47% | 359,733 | 142% |
| Total estimated power consumption (mW) | | 30 | 30 | 0% | 35 | 17% | 37 | 23% | 48 | 60% |

Conclusion

Thus, an improved apparatus for acquisition and tracking of global navigation satellite system (GNSS) signals, a global navigation satellite signal receiver system employing the apparatus, and corresponding method of operation have been provided.

The characteristics of the civil GNSS signals have been identified and addressed in the Universal Tracking Channel embodied in the Channel Processors 204 according to the invention, thus maintaining low power consumption and avoiding idle channels while maintaining a high level of robust tracking and flexibility. The proposed architecture allows sequential acquisition and tracking of any chipping rate, any carrier frequency, any FDMA channel, any modulation (i.e. BPSK, sin/cos $BOC_{(x,y)}$, CBOC and TMBOC), any constellation and is completely configurable with respect to integration times, discriminator function, and so on. It also provides robustness against jamming or system failures. The dual component architecture allows an interesting sequential acquisition option: dual code delay estimation for two times faster acquisition. Moreover, its upgradable memory codes and configurability of the sub-carriers (phase and weights $\alpha$ and $\beta$) make it future-compliant. This came at the cost of increasing the number of non-coherent phase tracking channel correlators from 6 to only 16 for the dual component channel, because of the reduction in sub-carrier resources achieved through their combination.

The Universal Channel allows acquisition and tracking of multi-frequency signals, from all existing and upcoming global, regional and augmentation navigation satellite systems (GNSS), whose specifications are known, (i.e., the carrier's, the modulation's and the spreading codes' characteristics), assuming an RF front-end has translated the targeted spectrum to intermediate frequency (IF). Each identical channel includes all the resources necessary to harvest precise and robust measurements obtained from the processing of all the signal's particularities, such as its complexity and available power. This allows it to be configured according to the targeted signal's requirements by enabling or not, each of its modules. This strategy allows minimizing power consumption when a subset of functionalities is not used. Hence, the design ensures its user a precise, continuous, reliable and robust position, regardless of which satellites are in view, how hostile the environment is, or which sources of interference are present.

Instead of populating a large number of dedicated channels (i.e. a given number of specific channels per signal type) in a receiver, usable GNSS signals are distributed to only a few Universal Channels providing the same or even better performance than those obtained with high-end receivers. With this configurability level, the Universal Channel can work with any IF signal bandwidth, any sampling frequency and any type of GNSS RF receiver architecture.

By at least partially storing spreading codes in memory, and dedicating circuitry to increasing numbers of real-time spreading code generators, unnecessary design flexibility constraint is avoided. Additionally by, at least partially, combining components of data and pilot, flexibility of design is also increased. Subcarrier generation, optionally using a single oscillator source per channel, and weighted combination reduce the allocation of dedicated resources permitting retention of undedicated resources able to be deployed, thus permitting greater and more rapid adaptation to different types of GNSS channels, both existing and imminent.

Any and all software modules described in the present application comprise a computer readable code stored in a computer readable storage medium, for example memory, CD-ROM, DVD or the like, to be executed by a processor to provide the functionality as described above.

Although embodiments of the invention have been described in detail, it will be apparent to one skilled in the art that variations and modifications to the embodiments may be made within the following claims.

What is claimed is:

1. An acquisition and tracking apparatus for tracking a plurality of spread spectrum navigation signals, each modulated according to one of a set of modulation types on a higher frequency carrier converted into an intermediate frequency signal, the carrier comprising one or more subcarriers and a navigation message modulated with a spreading code, the spreading code comprising a data component for carrying the navigation message, the spreading codes having a nominal epoch which is essentially a multiple of a predetermined time period, the apparatus comprising a plurality N of channel processors, each said channel processors including:
    a carrier demodulation module including a local carrier oscillator generating a local carrier frequency for demodulating the carrier from the intermediate frequency signal into a baseband signal;
    a code frequency generation module including a local code oscillator generating a code clock (CCK) at a code frequency, for clocking the code generation module;
    a code generation module generating replica of the data component, and a periodic interrupt signal which is substantially synchronous with the code epochs of the selected navigation signal;
    a subcarrier combining module, generating subcarrier replicas;
    a correlator module correlating the baseband signal with the replica of the data component and the subcarrier replicas, and outputting correlation signals sampled with the periodic interrupt signal;
    a parameter parsing module for providing operational parameters including a nominal carrier frequency control signal to the local carrier oscillator and a code frequency control signal to the local code oscillator;
    a discriminator module for processing the sampled correlation signals and generating a set of data synchronization error signals; and
    and an Error Evaluation Module generating a feedback value for adjusting the local carrier frequency and a Code Frequency Feedback signal for adjusting the code frequency.

2. The acquisition and tracking apparatus of claim 1, wherein the carrier further comprises a pilot component modulated with a pilot code, wherein:
    the code generation module comprises means for generating replicas of the pilot component; and
    the correlator module comprises means for correlating the baseband signal with the replicas of the pilot component, and outputting correlation signals sampled with the periodic interrupt signal.

3. The acquisition and tracking apparatus of claim 1, wherein the set of CDMA modulation types includes Binary Phase Shift Keying (BPSK), Binary Phase Shift Keying (BPSK) with Frequency Domain Multiplexing Access (FDMA), time multiplexed BPSK, Quadrature Phase Shift Keying (QPSK), sine and cosine Binary Offset Carrier (BOC), modified, complex, and time multiplexed BOC (TM-BOC).

4. The acquisition and tracking apparatus of claim 3, wherein the set of CDMA modulation types includes Alternate BOC (AltBOC) where two channel processors are used.

5. The acquisition and tracking apparatus of claim 1, wherein the Error Evaluation Module comprises:
    a set of programmable loop filters including:
        a first loop filter of configurable orders 0, 1, and 2, filtering the error signals, and generating a feedback value for adjusting the local carrier frequency to substantially a frequency of the higher frequency carrier;
        and second and third loop filters, each of one of configurable orders 0, 1, and 2, filtering the error signals; and
        an Improved Dual Estimator Module coupled to the outputs of the second and third loop filters, and generating a Code Frequency Feedback signal for adjusting the code frequency to be substantially equal a predetermined multiple of the frequency of the code epoch.

6. The acquisition and tracking apparatus of claim 1, wherein:
    the local carrier oscillator comprises means for generating a carrier phase signal;
    the local code oscillator comprises means for generating a code phase signal;
    each of the carrier phase and the code phase being sampled with the periodic interrupt signal,
    the acquisition and tracing apparatus further comprises:
    a master clock module generating a global time signal including a global interrupt pulse; and
    a global interrupt manager, distributing the global time signal to channel processors and collecting accumulated data, including at least one of the correlation signals and the sampled carrier and code phase signals, from each channel processors and forwarding the accumulated data to a computer host for further processing.

7. The acquisition and tracking apparatus of claim 2, wherein the code generation module comprises:
    a code counter clocked by the code clock (CCK);
    a data code memory for storing a data code sequence, which corresponds to a data code sequence of the selected navigation signal and, sequentially addressed by the code counter outputting a primary data memory code bit stream is a primary part of the replica of the data component;

a data code shift register having a tap spacing input which defines a delay spacing, to programmably delay the primary data memory code bit stream and generate prompt (P_data), early (E_data), and late (L_data) versions of it, the delay between the early and prompt versions being equal to the delay between the prompt and late versions, the delay being determined by a tap spacing command included in the operational parameters and coupled operatively to the tap spacing input;

a pilot code memory for storing a pilot code sequence which corresponds to a pilot code sequence of the selected navigation signal and, sequentially addressed by the code counter outputting a primary pilot memory code bit stream, which is a primary part of the replica of the pilot code component;

a pilot code shift register having a tap spacing input which defines a delay spacing, to programmably delay the primary pilot memory code bit stream and generate prompt (P_data), early (E_data), and late (L_data) versions of it, the delay between the early and prompt versions being equal to the delay between the prompt and late versions, the delay being determined by the tap spacing command.

8. The apparatus of claim 3, wherein at least one of the navigation signals includes modulation with at least one of data and pilot secondary spreading codes, the code generation module further comprises:

a Secondary Chip Register for buffering secondary data and pilot code chips periodically received from the parameter parsing module;

an exclusive OR gate for modifying the primary data memory code bit stream with the buffered secondary data code chip which is a secondary part of the replica of the data code component; and an exclusive OR gate for modifying the primary pilot memory code bit stream with the buffered secondary pilot code chip which is a secondary part of the replica of the pilot code component.

9. The acquisition and tracking apparatus of claim 7, wherein at least one of the navigation signals includes modulation in which data and pilot codes are time multiplexed, the code generation module further comprises a Time Multiplexed BPSK (TMBPSK) Module including:

a frequency divider circuit for dividing the frequency of the code clock (CCK) by a factor and generating a "Slower Clock" signal;

a first single-bit selector for substituting the code clock (CCK) with the "Slower Clock" signal for clocking the binary code counter;

a Code Generator for generating a Pseudo Random Noise (PRN) code signal 664;

a time multiplexer for multiplexing the PRN code signal with the primary pilot memory code bit stream to generate an Effective Spreading Code;

a second single-bit selector for substituting the primary pilot memory code bit stream with the Effective Spreading Code for modification with the secondary data code chip by the exclusive OR gate.

10. The acquisition and tracking apparatus of claim 1, wherein:

the code generation module comprises a data code shift register for delaying the replica of the data component by a programmable amount; and the correlator module comprises means for correlating the baseband signal with the delayed replica, and forwarding the correlation result to a computing host for evaluation.

11. The apparatus of claim 2, wherein the correlator module comprises a data correlator array for correlating the baseband signal with the replicas of the data component including subcarrier replicas, and a pilot correlator array for correlating the baseband signal with the replicas of the pilot component including pilot subcarrier replicas.

12. The apparatus of claim 7, wherein the code frequency generation module comprises:

a code frequency oscillator generating a code super clock;

a first programmable sin-cosine divider for dividing the code super clock by a factor to generate a first raw sub-carrier signal, selectively programmed to have one of: a cosine or a sine phase relationship to the code clock;

a Sub-carrier 2 Shift Register having a tap spacing input which defines a delay spacing, to programmably delay the first raw sub-carrier signal and generate prompt (SC2P), early (SC2E), and late (SC2L) versions of a first subcarrier replica signal, the delay between the early and prompt versions being equal to the delay between the prompt and late versions, the delay being determined with the tap spacing command included in the operational parameters and coupled operatively to the tap spacing input.

13. The apparatus of claim 12, wherein the code frequency generation module further comprises:

a Sub-Carrier Clock Divider (SC-CK Div) for dividing the code super clock by a first programmable factor (Div-Count 2) to generate an intermediate square wave;

a second programmable sin-cosine divider for dividing the intermediate square wave by a factor and to generate a second raw sub-carrier signal, selectively programmed to have one of a cosine or a sine phase relationship to the code clock;

a Sub-carrier 1 Shift Register (SC 1 SR) having a tap spacing input which defines a delay spacing, to programmably delay the second raw sub-carrier signal and generate prompt (SC1P), early (SC1E), and late (SC1L) versions of a second sub-carrier replica signal, the delay between the early and prompt versions being equal to the delay between the prompt and late versions, the delay being determined with the tap spacing command coupled operatively to the tap spacing input.

14. The apparatus of claim 13, wherein the code frequency generation module further comprises a Code Clock Divider (SC-CK Div) for dividing the intermediate square wave by a second programmable factor (Div-Count 1) to generate the code clock (CCK).

15. The apparatus of claim 14, the frequency of the of the local code oscillator being set to equal the nominal code frequency of the selected one of the navigation signals, and first and second programmable factors (Div-Count 2 and Div-Count 1) being set to unity one when no subcarrier replica signals are required.

16. The apparatus of claim 10, wherein the data code shift register comprises:

a variable spacing tap controlled by a VSC Delay control signal, the variable spacing tap outputting a variable spacing "M_tap" code signal; and a variable spacing correlator for correlating the variable spacing "M_tap" code signal with the baseband signal to generate a variable spacing correlation (VSC) value.

17. The apparatus of claim 16, further comprising a selector for selecting an in-phase component "I" of the baseband signal, alternatively uncorrelated or correlated with subcarriers as determined by a programmable parameter (VSC_select).

18. The apparatus of claim 1, wherein the subcarrier combining module comprises:
a first subtractor operable to combine early and late versions of the first subcarrier signal (SC1E and SC1L) into a first difference signal (SC1Diff);
a first multiplier (M17) for multiplying a programmable first data weighting factor ($\alpha$-data) with SC1Diff;
a second multiplier (M20) for multiplying the first data weighting factor ($\alpha$-data) with the prompt version of the first subcarrier signal (SC1P);
a second subtractor for combining the early and late versions of the second subcarrier signal (SC2E and SC2L) into a second difference signal (SC2Diff);
a third multiplier (M18) for multiplying a programmable second data weighting factor $\beta$-data) with SC2Diff to generate a combined data sub-carrier SC_Ddata;
a fourth multiplier (M19) for multiplying the second data weighting factor ($\beta$-data) with the prompt version of the second subcarrier signal (SC2P);
a first adder for adding the outputs of the first and third multipliers (M17 and M18) to generate a combined difference data sub-carrier SC_Ddata for correlating with the baseband signal in the correlator module; and
a second adder for adding the outputs of the second and fourth multipliers (M20 and M19) to generate a combined prompt data sub-carrier SC_Pdata for correlating with the baseband signal in the correlator module.

19. The acquisition and tracking apparatus of claim 18, the subcarrier combining module further comprising:
a fifth multiplier (M13) for multiplying a programmable first pilot weighting factor ($\alpha$-pilot) with SC1Diff;
a sixth multiplier (M16) for multiplying the first pilot weighting factor ($\alpha$-pilot) with the prompt version of the first subcarrier signal (SC1P);
a seventh multiplier (M14) for multiplying a programmable second pilot weighting factor ($\beta$-pilot) with SC2Diff to generate a combined data sub-carrier SC_Dpilot;
a eights multiplier (M15) for multiplying the second pilot weighting factor ($\beta$-pilot) with the prompt version of the second subcarrier signal (SC2P);
a third adder for adding the outputs of the first and third multipliers (M17 and M18) to generate a combined difference pilot sub-carrier SC_Dpilot for correlating with the baseband signal in the correlator module; and
a fourth adder for adding the outputs of the second and fourth multipliers (M20 and M19) to generate a combined prompt pilot sub-carrier SC_Ppilot for correlating with the baseband signal in the correlator module.

20. The acquisition and tracking apparatus of claim 2, further including a TMBOC Multiplexer module for dynamically assigning the weighting factors ($\alpha$-pilot, $\alpha$-data, $\beta$-pilot, $\beta$-data) to weighting factors received from a set of weighting factors ($\alpha$, $\beta$ weights), the assignments being controlled according to a specified pattern, the TMBOC Multiplexer module comprising:
a pattern memory for storing the specified pattern;
a pattern counter for cyclically addressing the pattern memory, the pattern counter being reset by the periodic interrupt and clocked by the effective code clock;
a set of weight selectors being controlled by a data output of the pattern memory to select the weighting factors ($\alpha$-pilot, $\alpha$-data, $\beta$-pilot, $\beta$-data) from among the set of weighting factors ($\alpha$, $\beta$ weights) according to the pattern stored in the pattern memory.

21. The apparatus of claim 1, further including:
a selector for selecting one of a plurality of available navigation signals in the form of wide band digitized intermediate frequency (IF) signals, for acquisition and tracking; and
a customizable IF Filter for filtering out frequencies that are outside the frequency range of the selected navigation signal.

22. The apparatus of claim 2, further comprising:
an Accumulator Buffer, for coherently or non-coherently accumulating outputs of the correlator module;
in the Discriminator Module, means for generating a set of combined data and pilot synchronization errors from the pilot and data correlations received from the Accumulator Buffer, the operation of the Discriminator Module being controlled by modulation type information received from a Parameter Parsing Module;
a Dual Estimator Module, generating a Code Frequency Feedback signal for adjusting the code clock (CCK); and
a set of Loop Filters for filtering the set of combined data and pilot synchronization errors to achieve loop stability and sending the filtered values to the Dual Estimator Module, and for sending a filtered carrier frequency feedback value to the numerically controlled local carrier oscillator.

23. A global navigation satellite signal receiver system, comprising:
an acquisition and tracking apparatus for tracking a plurality of spread spectrum navigation signals, each modulated according to one of a set of modulation types on a high frequency carrier with a navigation message riding on a spreading code which comprises a combination of a primary data code component for carrying the navigation message; a primary pilot code component; secondary data and pilot code components; and a plurality of data and pilot subcarrier components, the apparatus comprising a plurality N of channel processors, each channel processor receiving a selected one of the navigation signals, and including:
a code generation module generating local code replicas of code components of the spreading code of said selected signal;
a carrier demodulation module, demodulating the carrier of said selected signal into a baseband signal;
a code frequency generation module clocking the code generation module and generating local subcarrier replicas of subcarrier components of the spreading code of said selected signal;
a subcarrier combining module combining the local subcarrier replicas to generate combined subcarrier replicas and multiplying said combined subcarrier replicas with weighting factors;
a correlator module correlating the baseband signal with the local code replicas and the weighted combined subcarrier replicas into a set of correlation results; and
a Local Interrupt Module receiving the correlation results therefrom and controlling the generating of the local code replicas and local subcarrier replicas.

24. An acquisition and tracking apparatus for tracking a plurality of spread spectrum navigation signals, each modulated according to one of a set of modulation types on a high frequency carrier with a navigation message riding on a spreading code which comprises a combination of a primary data code component for carrying the navigation message; a primary pilot code component; secondary data and pilot code components; and a plurality of data and pilot subcarrier components, the apparatus comprising a plurality N of channel processors, each channel processor receiving a selected one of the navigation signals, and including:

a code generation module generating local code replicas of code components of the spreading code of said selected signal;

a carrier demodulation module, demodulating the carrier of said selected signal into a baseband signal;

a code frequency generation module clocking the code generation module and generating local subcarrier replicas of subcarrier components of the spreading code of said selected signal;

a subcarrier combining module combining the local subcarrier replicas to generate combined subcarrier replicas and multiplying said combined subcarrier replicas with weighting factors;

a correlator module correlating the baseband signal with the local code replicas and the weighted combined subcarrier replicas into a set of correlation results; and a Local Interrupt Module receiving the correlation results therefrom and controlling the generating of the local code replicas and local subcarrier replicas.

* * * * *